(12) United States Patent
Abe et al.

(10) Patent No.: US 7,403,904 B2
(45) Date of Patent: Jul. 22, 2008

(54) SYSTEM AND METHOD FOR SEQUENTIAL DECISION MAKING FOR CUSTOMER RELATIONSHIP MANAGEMENT

(75) Inventors: Naoki Abe, Rye, NY (US); Edwin P. D. Pednault, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 1295 days.

(21) Appl. No.: 10/198,102

(22) Filed: Jul. 19, 2002

(65) Prior Publication Data

US 2004/0015386 A1 Jan. 22, 2004

(51) Int. Cl.
G06F 17/60 (2006.01)
(52) U.S. Cl. .................. 705/10; 706/14; 705/14
(58) Field of Classification Search .......... None
See application file for complete search history.

(56) References Cited

U.S. PATENT DOCUMENTS

| | | | | |
|---|---|---|---|---|
| 6,519,571 | B1* | 2/2003 | Guheen et al. | 705/14 |
| 6,970,830 | B1* | 11/2005 | Samra et al. | 705/10 |
| 7,003,476 | B1* | 2/2006 | Samra et al. | 705/10 |
| 7,006,979 | B1* | 2/2006 | Samra et al. | 705/10 |
| 7,010,495 | B1* | 3/2006 | Samra et al. | 705/10 |
| 2002/0133391 | A1* | 9/2002 | Johnson | 705/10 |
| 2003/0204368 | A1* | 10/2003 | Ertin et al. | 702/179 |
| 2005/0071223 | A1* | 3/2005 | Jain et al. | 705/14 |

FOREIGN PATENT DOCUMENTS

WO WO0129692 A * 4/2001

OTHER PUBLICATIONS

Malhotra et al. "Marketing Research: . . . for the Twenty-First Century," Journal of the Academy of Marketing Science, vol. 27, No. 1, pp. 160-183.*
Little, John D. C. Marketing Automation on the Internet. 5th Invitational Choice Symposium, UC Berkeley, Jun. 1-5, 2001 [slide presentation].*
Littman, Michael L. Algorithms for Sequential Decision Making. Ph. D. Dissertation, Department of Computer Science, Brown University, Mar. 1996.*
Ribeiro, C. Artificial Intelligence Review. May 2002, vol. 17, Issue 3 (abstract only).*
Georges, and Milley ("KDD'99 Competition: Knowledge Discovery Contest", ACM SIGKDD Explorations, Jan. 2000 (pp. 79-84).*
Boyan, Justin A. Learning Evaluation Functions for Global Optimization, PhD Dissertation, CMU-CS-98-152, Aug. 1, 1998 (pp. 1-41).*

(Continued)

*Primary Examiner*—Romain Jeanty
*Assistant Examiner*—Dave Robertson
(74) *Attorney, Agent, or Firm*—Stephen C. Kaufman, Esq.; McGinn IP Law Group, PLLC

(57) ABSTRACT

A system and method for sequential decision-making for customer relationship management includes providing customer data including stimulus-response history data, and automatically generating actionable rules based on the customer data. Further, automatically generating actionable rules may include estimating a value function using reinforcement learning.

31 Claims, 19 Drawing Sheets

OTHER PUBLICATIONS

Szepesvair, Csaba and Littman, Michael L. Generalized Markov Decision Processes: Dynamic Programming and Reinforcement Learning Algorithms, Technical Report CS-96-11, Brown University, Nov. 25, 1997.*

Xin Wang et al., "Efficient Value Function Approximation Using Regression Trees", Department of Computer Science, Oregon State University, Corvallis, Oregon, pp. 1-11.

John N. Tsitsiklis et al., "An Analysis of Temporal-Difference Learning with Function Approximation", Laboratory for Information and Decision Systems, Massachusetts Institute of Technology, Cambridge, MA, pp. 1-32.

Pedro Domingos, "Meta Cost: A General Method for Making Classifiers Cost-Sensitive", Artificial Intelligence Group.

Wei Fan et al., "A Framework for Scalable cost-sensitive Learning Based on Combining Probabilities and Benefits", IBM T.J. Watson Research.

Wei Fan et al., "AdaCost: Misclassification Cost-sensitive Boosting", Computer Science Department., Columbia University, New York, NY.

Christopher J.C.H. Watkins et al., "Technical Note Q-Learning", Machine Learning 1992, pp. 55-68.

Leslie Pack Kaelbling et al., "Reinforcement Learning: A Survey", *Journal of Artificial Intelligence Reserach 4* (1996), pp. 237-285.

G.A. Rummery et al., "On-Line Q-Learning Using Connectionist Systems", Cambridge University Engineering Department, England, Sep. 1994, pp. 1-20.

Dragos D. Margineantu et al., "Bootstrap Methods for the Cost-Sensitive Evaluation of Classifiers", Department of Computer Science, Oregon State University, Corvallis, OR.

Bianca Zadrozny et al., "Learning and Making Decisions When Costs and Probabilities are Both Unknown", Department of Computer Science and Engineering, University of California, San Diego La Jolla, CA.

Charles Elkan, "The Foundation of Cost-Sensitive Learning", Department of Computer Science and Engineering, University of California, San Diego La Jolla, CA.

"Cost-Sensitive Learning Bibliography", http://home.ptd.net/•olcay/cost-sensitive.html, Nov. 26, 2002, pp. 1-7.

C. Apte et al., "Segmentation-Based Modeling for Advanced Targeted Marketing", IBM Research Division, pp. 1-10, Mar. 8, 2001.

* cited by examiner

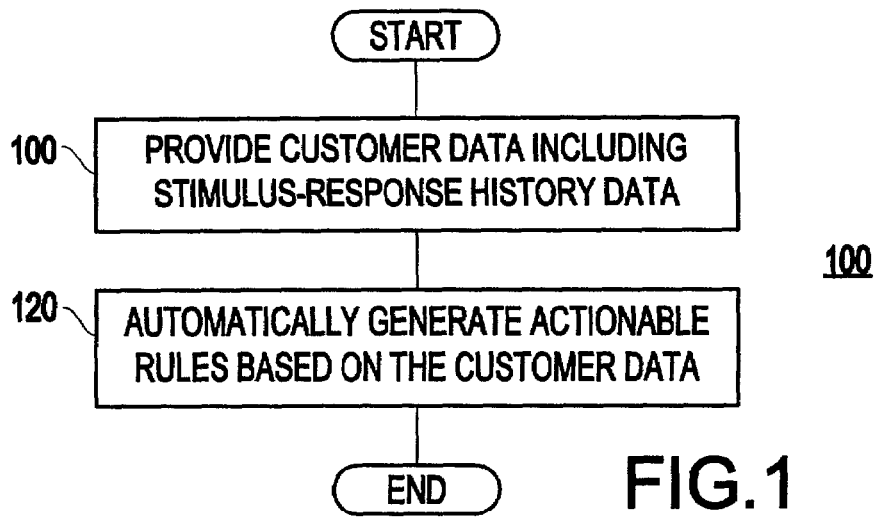

FIG.1

Procedure Batch - RL (sarsa)

Premise:

A base learning module, Base, for regression is given.

Input data: $D = \{e_i | i = 1,...,N\}$ where $e_i = \{\langle s_{i,j}, a_{i,j}, r_{i,j}\rangle | j = 1,...,l_i\}$ ($e_i$ is the $i$-th episode, and $l_i$ is the length of $e_i$.)

1. For all $e_i \in D$ $D_{0,i} = \{\langle s_{i,j}, a_{i,j}, r_{i,j}\rangle | j = 1,...,l_i\}$ 2. $D_0 = \bigcup_{i=1,...,N} D_{0,i}$ 3. $Q_0 = \text{Base}(D_0)$.

4. For $k = 1$ to *final*

4.1 For all $e_i \in D$ 4.1.1 For $j = 1$ to $l_i - 1$ 4.1.1.1 $v_{i,j}^{(k)} = Q_{k-1}(s_{i,j}, a_{i,j}) + \alpha_k (r_{i,j} + \gamma Q_{k-1}(s_{i,j+1}, a_{i,j+1}) - Q_{k-1}(s_{i,j}, a_{i,j}))$ 4.1.1.2 $D_{k,i} = \{\langle s_{i,j}, a_{i,j}, v_{i,j}^{(k)}\rangle | j = 1,...,l_i - 1\}$ 4.2 $D_k = \bigcup_{i=1,...,N} D_{k,i}$ 4.3 $Q_k = \text{Base}(D_k)$ 5. Output the final model, $Q_{final}$.

FIG.2

Procedure Batch-RL (Q)
Identical to Batch-RL(sarsa) except that 4.1.1.1 is replaced by:

4.1.1.1 $\upsilon_{i,j}^{(k)} = Q_{k-1}(s_{i,j}, a_{i,j}) + \alpha_k (r_{i,j} + \gamma \max_a Q_{k-1}(s_{i,j+1}, a) - Q_{k-1}(s_{i,j}, a_{i,j}))$

FIG.3

Procedure Batch - RL (Random - sampling)
Premise:
  A base learning module, Base, for regression is given.
Input data: $D = \{e_i | i = 1,...,N\}$ where
  $e_i = \{(s_{i,j}, a_{i,j}, r_{i,j}) | j = 1,...,l_i\}$
  ($e_i$ is the $i$-th episode, and $l_i$ is the length or number of events in $e_i$.)
1. For all $e_i$ in *randomy selected* subset $R_0$ of $D$
  $D_{0,i} = \{(s_{i,j}, a_{i,j}, r_{i,j}) | j = 1,...,l_i\}$
2. $D_0 = \bigcup_{e_i \in R} D_{0,i}$
3. $Q_0 = \text{Base}(D_0)$.
4. For $k = 1$ to *final*
  4.1 For all $e_i$ in *randomy selected* subset $R_k$ of $D$
    4.1.1 For $j = 1$ to $l_i - 1$
      4.1.1.1 $\upsilon_{i,j}^{(k)} = Q_{k-1}(s_{i,j}, a_{i,j}) + \alpha_k (r_{i,j} + \gamma Q_{k-1}(s_{i,j+1}, a_{i,j+1}) - Q_{k-1}(s_{i,j}, a_{i,j}))$
      4.1.1.2 $D_{k,i} = \{(s_{i,j}, a_{i,j}, \upsilon_{i,j}^{(k)}) | j = 1,...,l_i - 1\}$
  4.2 $D_k = \bigcup_{e_i \in R} D_{k,i}$
  4.3 $Q_k = \text{Base}(D_k)$
5. Output the final model, $Q_{final}$.

FIG.4

Procedure Batch - RL (Q - sampling)
Identical to Batch - RL(Random - sampling) except that Block 4.1 is replaced by :
4.1 For all $e_i$ in *randomy selected* subset $R_k$ of $D$
    4.1.1 $D_{k,i} = 0$
    4.1.2 For $j = 1$ to $l_i - 1$
        If $Q_{k-1}(s_{i,j}, a_{i,j}) = \max_a Q_{k-1}(s_{i,j+1}, a)$
        Then
        4.1.2.1 $v_{i,j}^{(k)} = Q_{k-1}(s_{i,j}, a_{i,j}) + \alpha_k (r_{i,j} + \gamma Q_{k-1}(s_{i,j+1}, a_{i,j+1}) - Q_{k-1}(s_{i,j}, a_{i,j}))$
        4.1.2.2 $D_{k,i} = D_{k,i} \cup \{\langle s_{i,j}, a_{i,j}, v_{i,j}^{(k)} \rangle\}$

FIG.5

Procedure Batch-RL (TD($\lambda$)-sampling)
Identical to Batch-RL(Random-sampling) except that Input and
Block 4.1 is replaced respectively by:

Input data: $D = \{e_i | i = 1, ..., N\}$ where
$e_i = \{\langle s_{i,j}, a_{i,j}, r_{i,j} \rangle j = 1, ..., l_i\}$
$\lambda (0 < \lambda < 1)$ is a parameter for TD($\lambda$)
L is a parameter for the number of lookahead steps 4.1 For all $e_i$ in *randomy selected* subset $R_k$ of $D$
    4.1.1 $D_{k,i} = 0$
    4.1.2 For $j = 1$ to $l_i - L$
        If $Q_{k-1}(s_{i,j+1}, a_{i,j+1}) = \max_a Q_{k-1}(s_{i,j+1}, a)$
        and ... and
        $Q_{k-1}(s_{i,j+L}, a_{i,j+L}) = \max_a Q_{k-1}(s_{i,j+L}, a)$
        Then
        4.1.2.1 For each $n$, $1 < n \geq L$
            $R_{i,j}^{(n)} = r_{i,j+1} + \gamma r_{i,j+2} + ... + \gamma^n Q(s_{i+n}, a_{i+n})$
        4.1.2.2 $v_{i,j}^{(k)} = Q_{k-1}(s_{i,j}, a_{i,j}) + \alpha_k ((1-\lambda) \sum_{n=1}^{L} \lambda^{n-1} R_{i,j}^{(n)} r_{i,j} - Q_{k-1}(s_{i,j}, a_{i,j}))$
        4.1.2.3 $D_{k,i} = D_{k,i} \cup \{\langle s_{i,j}, a_{i,j}, v_{i,j}^{(k)} \rangle\}$

FIG.6

TABLE 1

| FEATURES | DESCRIPTIONS |
| --- | --- |
| age | individual's age |
| income | income bracket |
| ngiftall | number of gifts to date |
| numprom | number of promotions to date |
| frequency | ngiftall / numprom |
| recency | number of months since last gift |
| lastgift | amount in dollars of gifts to date |
| ramntall | total amount of gifts to date |
| nrecproms | num. recent promotions (last 6 months) |
| nrecgifts | num. recent gifts (last 6 months) |
| totrecamt | total amount of recent gifts (6 months) |
| recamtpergift | recent gift amount per gift (6 months) |
| recamtpergift | recent gift amount per prom (6 months) |
| promrecency | months since last promotion |
| timelag | months between first promo and gift |
| recencyratio | recency / timelag |
| promrecratio | promrecency / timelag |
| action | was mailed in current promotion (0.1) |

FIG.7

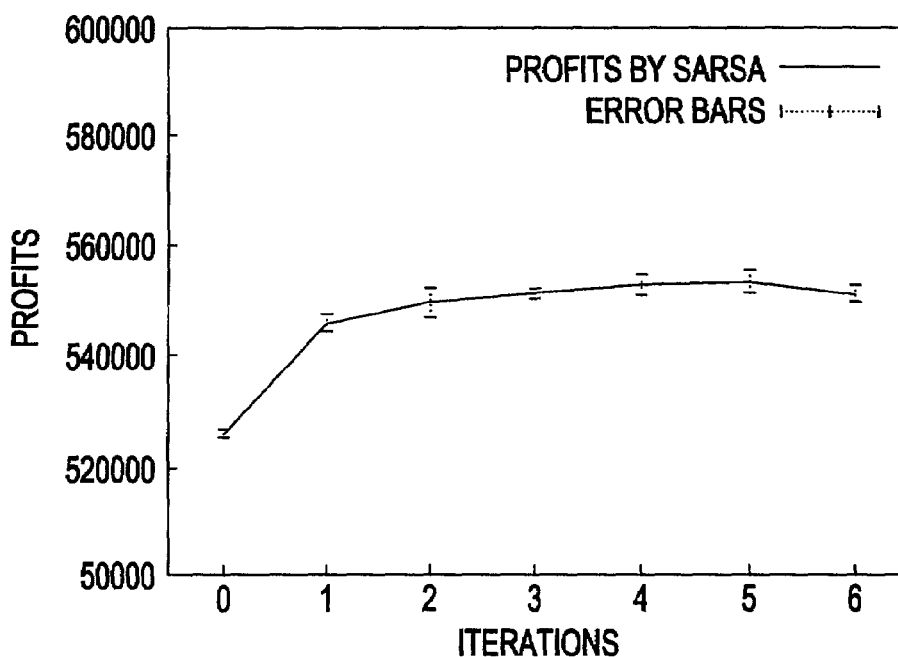

FIG.8

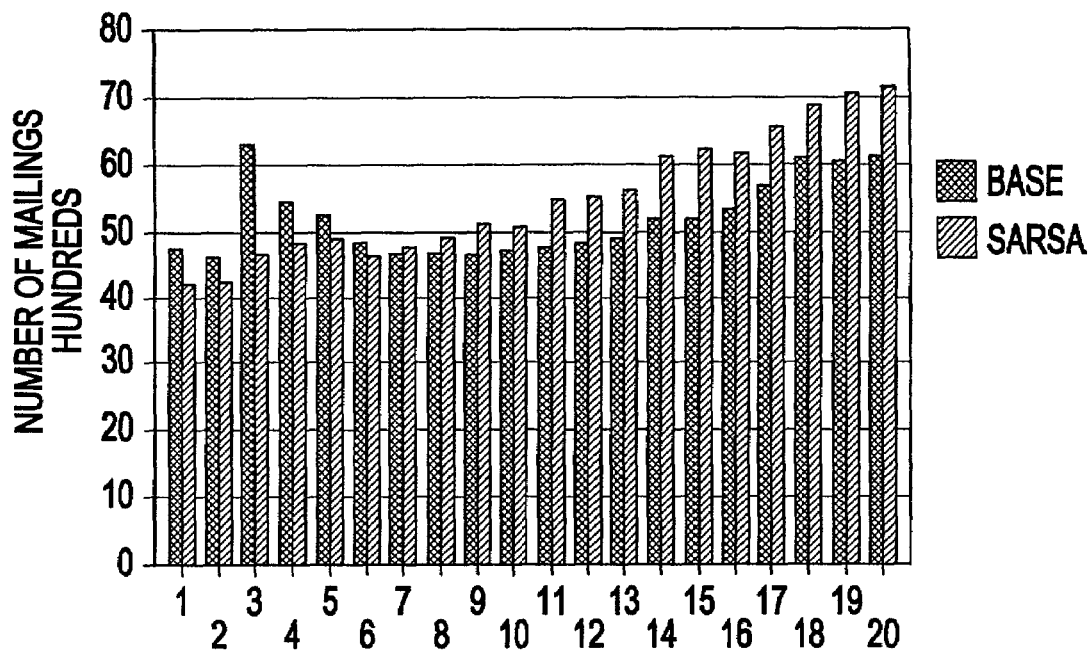
FIG.11 CAMPAIGN NUMBER
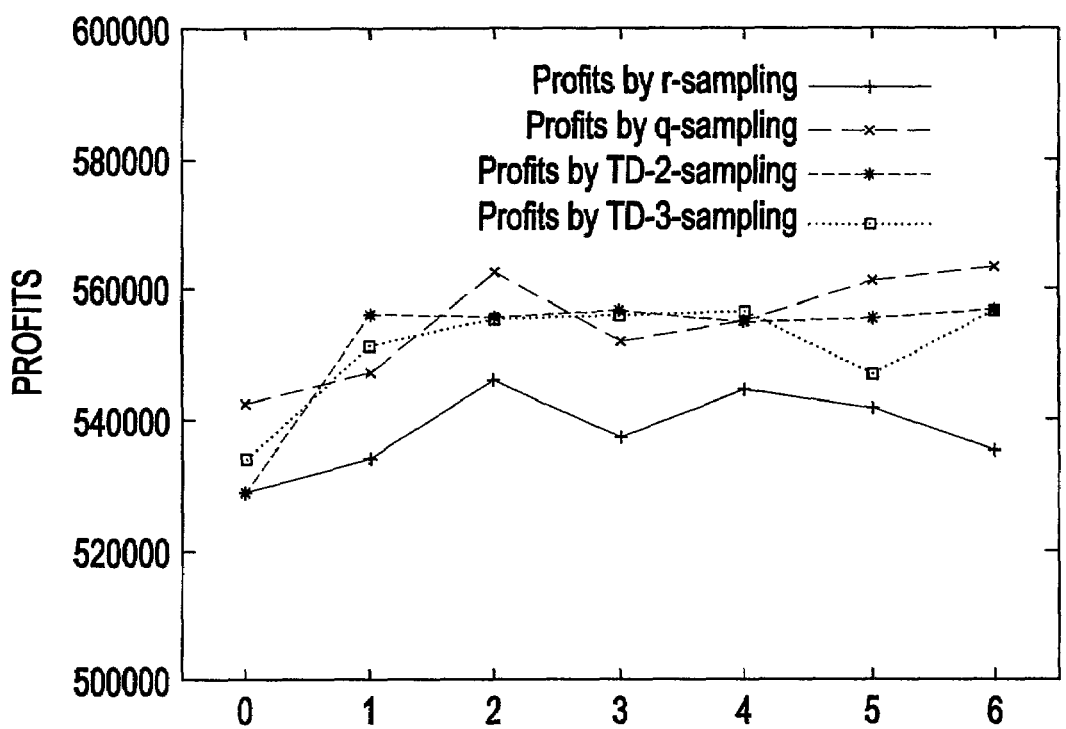
FIG.12 ITERATIONS

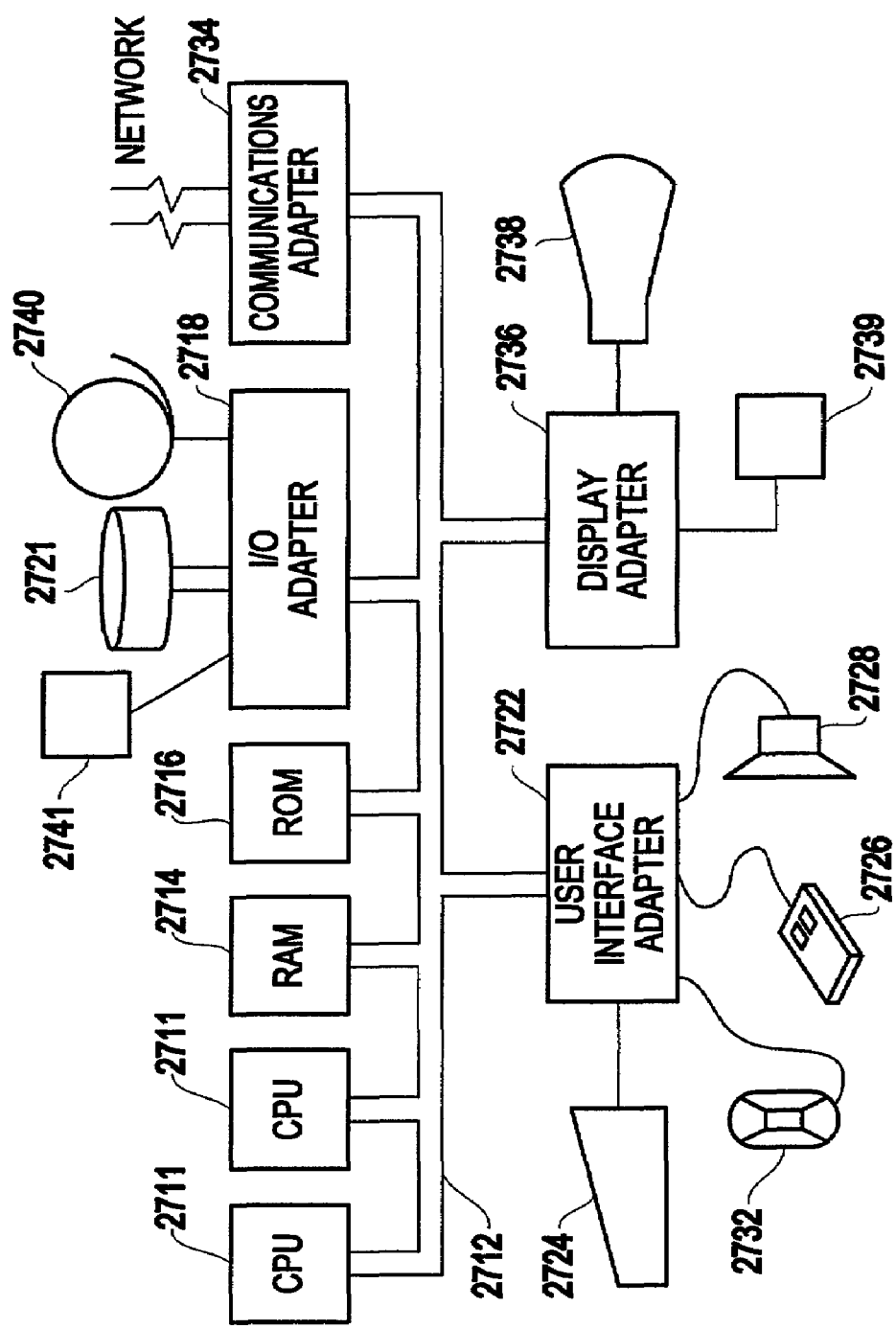

SYSTEM AND METHOD FOR SEQUENTIAL DECISION MAKING FOR CUSTOMER RELATIONSHIP MANAGEMENT

BACKGROUND OF THE INVENTION

1. Field of the Invention

The present invention generally relates to a system and method for sequential decision making for customer relationship management and, more particularly, a system and method for sequential decision making for customer relationship management which may utilize reinforcement learning.

2. Description of the Related Art

In applications of data mining to targeted marketing, common practice has been to apply a classification or regression method to a customer database, and identify a subset of the customers who are likely to generate positive profits for a given marketing action, and then target the action to those customers. In actual practice of targeted marketing, however, marketing actions are never taken in isolation but rather a series of marketing actions are taken over time. It is therefore desirable that the retailers optimize their marketing actions not only to maximize the single-event profits, but total, cumulative profits accrued over such series of actions.

More specifically, in the last several years, there has been an increasing interest in the machine learning community on the issue of cost-sensitive learning and decision making, specifically as it may apply to data mining. Various authors have noted the limitations of classic supervised learning methods when the acquired rules are used for cost-sensitive decision making (see, e.g., P. Turney, "Cost-sensitive Learning Bibliography", Institute for Information Technology, National Research Council, Ottawa, Canada, 2000 (http://extractor.iit.nrc.ca/bibliographies/cost-sensitive.html); P. Domingos, "MetaCost: A General Method for Making Classifiers Cost Sensitive", *Proceedings of the Fifth International Conference on Knowledge Discovery and Data Mining*, pages 155-164. ACM Press, 1999; C. Elkan, "The Foundations of Cost-sensitive Learning", *Proceedings of the Seventeenth International Joint Conference on Artificial Intelligence*, August 2001; B. Zadrozny and C. Elkan, "Learning and making decisions when costs and probabilities are both unknown", *Proceedings of the Seventh International Conference on Knowledge Discovery and Data Mining*, 2001; and D. D. Margineatu and T. G. Dietterich, "Bootstrap Methods for the Cost-sensitive Evaluation of Classifiers", *Proc. 17th International Conf. on Machine Learning*, pages 583-590, Morgan Kaufmann, San Francisco, Calif., 2000.).

A number of cost-sensitive learning methods have been developed (e.g., see P. Domingos, "MetaCost: A General Method for Making Classifiers Cost Sensitive", *Proceedings of the Fifth International Conference on Knowledge Discovery and Data Mining*, pages 155-164. ACM Press, 1999; B. Zadrozny and C. Elkan, "Learning and Making Decisions When Costs and Probabilities are Both Unknown: *Proceedings of the Seventh International Conference on Knowledge Discovery and Data Mining*, 2001; and W. Fan, S. J. Stolfo, J. Zhang, and P. K. Chan, "AdaCost: Misclassification Cost-sensitive Boosting" *Proc. 16th International Conf. on Machine Learning*, pages 97-105. Morgan Kaufmann, San Francisco, Calif., 1999) that have been shown to be superior to traditional classification-based methods.

However, these cost-sensitive methods only try to maximize the benefit (equivalently, minimize the cost) of a single decision, whereas in many applications sequences of decisions need to be made over time. In this more general setting, one must take into account not only the costs and benefits associated with each decision, but also the interactions among decision outcomes when sequences of decisions are made over time.

For example, in targeted marketing, customers are often selected for promotional mailings based on the profits or revenues they are expected to generate on each mailing when viewed in isolation. Profits or revenues are estimated using predictive models that are constructed based on historical customer-response data. To maximize expected profits for a given promotion, only those customers should be mailed whose predicted expected profit is nonzero when taking mailing costs into consideration (e.g., see B. Zadrozny and C. Elkan. Learning and Making Decisions When Costs and Probabilities are Both Unknown" *Proceedings of the Seventh International Conference on Knowledge Discovery and Data Mining*, 2001).

However, the above decision policy of selecting customers to maximize expected profits on each promotion in isolation is not guaranteed to maximize total profits generated over time. It may be, for example, that the expected profit obtained by mailing the current promotion to a certain customer might exceed the current cost of mailing. However, it might also increase the profits generated by that customer in future mailings. More generally, marketing actions that are desirable from the perspective of maximizing customer loyalty over time may sacrifice immediate rewards in the anticipation of larger future revenues.

The opposite can also be true. Saturating profitable customers with frequent promotional mail might decrease the profitability of those customers, either because of the annoyance factor or because of the simple fact that everyone has budgetary limits on the amounts they are willing or are able to spend per unit time. The latter implies that a point of diminishing returns will necessarily be reached for each customer as the frequency of mail they receive increases.

SUMMARY OF THE INVENTION

In view of the foregoing, and other problems, disadvantages, and drawbacks of conventional methods, the present invention has been devised, and it is an object of the present invention to provide a system and method for sequential decision making for customer relationship management.

With the present invention, the inventors propose a novel approach to sequential decision making for customer relationship management, which may be based, for example, on a reinforcement learning framework. Generally, the present invention may attempt to learn decision rules that optimize a sequence of cost-sensitive decisions so as to maximize the total benefits accrued over time.

The inventors conducted experiments using approximately two years of monthly promotion data derived from the well-known KDD Cup 1998 donation data set. The experimental results show that the proposed method for optimizing total accrued benefits out-performs the usual targeted-marketing methodology of optimizing each promotion in isolation. The inventors also analyzed the behavior of the targeting rules that were obtained and their appropriateness to the application domain.

The present invention includes an inventive method for sequential decision making (e.g., sequential cost-sensitive decision making) for customer relationship management. The inventive method includes providing customer data (e.g., consumer data, client data, donor data, etc.) comprising stimulus-response history data, and automatically generating actionable rules based on the customer data. Further, automatically generating actionable rules may include estimating a value function using reinforcement learning (e.g., reinforcement learning and dynamic programming). For example, estimating a value function may include value iteration.

Further, such decision making may include cost-sensitive decision making. For instance, reinforcement learning may include maximizing a net present value of profits with respect to a customer (consumer, client, company, etc.). For example, such reinforcement learning may maximize a cumulative reward, R, given by $$R = \sum_{t=0}^{\infty} \gamma^t r_t$$

where $r_t$ is the reward obtained at the t'th time step and $\gamma$ is some positive constant less than 1. For instance, $\gamma$ may include a discount factor for calculating a net present value of future rewards based on a given interest rate.

Further, the actionable rules may be generated using reinforcement learning based on a Markov Decision Process model with function approximation. For example, the batch reinforcement learning with function approximation may be based on Q-learning and/or sarsa-learning. For example, the batch reinforcement learning may be based on training data including sequences of states, actions, and resulting rewards.

In another aspect, the inventive method may include preparing customer data including stimulus-response history data, and using the customer data to output instance-in-time targeting rules (e.g., of general if-then style), so as to approximately maximize expected cumulative profits over time.

Further, the inventive method may be applied to cross-channel optimized marketing (CCOM). For example, the inventive method may include providing customer data including stimulus-response history data from a plurality of channels (e.g., "multiple" channgels), integrating the customer data, and automatically generating channel specific actionable rules based on the customer data. For instance, in this case the method may optimize (e.g., nearly optimize) cross-channel cumulative profits.

Further, providing customer data may include generating a sequence of event data which may include a customer's demographic features, and features, derived from the customer's stimulus-response history data, which collectively reflect the state of said customer at a certain point in time, an action (e.g., a marketing action) taken at or around that time by an entity (e.g., a seller such as a retailer), a response taken by the customer at or around a time of an event, and an amount of profit realized by the entity and associated with said action.

Further, automatically generating the actionable rules may include transforming an output of a value function estimation into the actionable rules. Specifically, transforming may include transforming a model of the value function into a set of actionable rules, so as to output a set of if-then style rules that specify what actions to take given a set of feature values corresponding to a customer, and that specify an action that corresponds to the action with an approximately maximum value according to the value function for a given set of feature values.

In addition, the transforming may include generating training data using a model of the value function. For instance, training data may include a set of feature values and an action that corresponds to a maximum value for the set of feature values, and outputting a set of rules that are based on the training data, for instance, using a data mining method (e.g., a supervised learning method) or a classifier (e.g., a classification method).

Further, providing customer data may include selecting customer data. For example, a value estimation may repeatedly call a data selection module one or more times per each iteration of a value iteration. In addition, the data selection module may access a customer and transaction history data set stored in a data storage device, and use a selection criteria to select a restricted subset for use in a value function estimation.

The selection criteria may include, for example, selecting only those events such that their "next" states satisfy a condition that an action taken corresponds to an action with a maximum estimated cumulative value, with respect to an estimated value function from a previous value iteration, selecting only those events such that their next n states satisfy a condition that an action taken in each state corresponds to an action with a maximum estimated cumulative value, selecting only those events such that their current states satisfy a condition that an action taken correspond to an action with a maximum estimated cumulative value, with respect to an estimated value function from a previous value iteration, selecting only those events such that their current and the next n states satisfy a condition that an action taken correspond to an action with a maximum estimated cumulative value, with respect to an estimated value function from a previous value iteration, and selecting only those events such that their current states satisfy a condition that an action taken corresponds to an action with a maximum upper bound of estimated cumulative value with respect to an estimated value function from a previous value iteration.

In addition, an n-step look ahead may be used in a value function update procedure within a value estimation module, in combination with a selective sampling with n-step look ahead. Further, the customer data may include transaction history data from multiple channels. For instance, providing customer data may include selecting customer data by accessing a number of channel specific databases, and forming an effective joining of data using a form of customer identification as a key.

The present invention also includes an inventive system for sequential decision making for customer relationship management. The inventive system includes a database for storing customer data including stimulus-response history data, and a processor for automatically generating actionable rules based on the customer data. For example, the processor may estimate a value function using reinforcement learning (e.g., reinforcement learning and dynamic programming).

Further, the inventive system may include a customer profile cache. For instance, when an actionable (e.g., targeting) rule is applied, the customer profile cache may be used to determine if an antecedent of an actionable rule is satisfied.

In another aspect, the inventive system may include a data preparation device for preparing customer data including stimulus-response history data, a value estimator for estimating a value function based on the customer data; and a rule transformer for generating actionable (e.g., targeting) rules based on the value function.

In another aspect, the inventive system may include a customer transaction cache for storing customer transaction data including stimulus-response history data, a customer profile cache for receiving an output of the customer transaction cache and storing current customer profile data, and a customer relationship management system, for receiving an output of the customer profile cache and customer relationship management rules, and execute the action specified by a rule that is identified as applicable. In this system, for example, the customer relationship management rules may be automatically generated based on the customer transaction data.

The present invention also includes a programmable storage medium tangibly embodying a program of machine-readable instructions executable by a digital processing apparatus to perform the inventive method.

With its unique and novel features, the inventive system and method provide an improved manner of decision making. Specifically, the present invention uses sequential decision making which is more accurate and efficient than conventional systems. Thus, for example, when applied to a customer-retailer relationship, unlike conventional systems, the present invention may maximize a net present value of profits with respect to the customer.

BRIEF DESCRIPTION OF THE DRAWINGS

The foregoing, and other objects, aspects, and advantages will be better understood from the following detailed description of a preferred embodiment(s) of the invention with reference to the drawings, in which:

FIG. 1 is a flow chart illustrating an inventive method 100 for sequential decision making for customer relationship management according to the present invention;

FIG. 2 provides possible pseudo-code for one version of batch reinforcement learning based on sarsa-learning according to the present invention;

FIG. 3 provides possible pseudo-code for one version of batch reinforcement learning based on Q-learning according to the present invention;

FIG. 4 provides possible pseudo-code for one version of batch reinforcement learning for random sampling according to the present invention;

FIG. 5 provides pseudo-code for one version of batch reinforcement learning for Q-sampling according to the present invention;

FIG. 6 provides possible pseudo-code for one version of batch reinforcement learning for TD($\lambda$)-sampling according to the present invention;

FIG. 7 provides Table 1 which lists an example of temporal features designed to capture the state of an individual at the time of each campaign;

FIG. 8 illustrates total life-time profits obtained by BatchRL (sarsa) according to the present invention;

FIG. 11 illustrates profits per campaign obtained by BatchRL(sarsa) and single-event method;

FIG. 12 illustrates life-time profits obtained by competing sampling methods as a function of value iteration number;

FIG. 27 illustrates an exemplary hardware/information handling system 2700 for use with the present invention therein; and FIG. 28 illustrates a signal bearing medium 2800 (e.g., storage medium) for storing steps of a program of a method according to the present invention.

DETAILED DESCRIPTION OF PREFERRED EMBODIMENTS OF THE INVENTION

Figure 9:
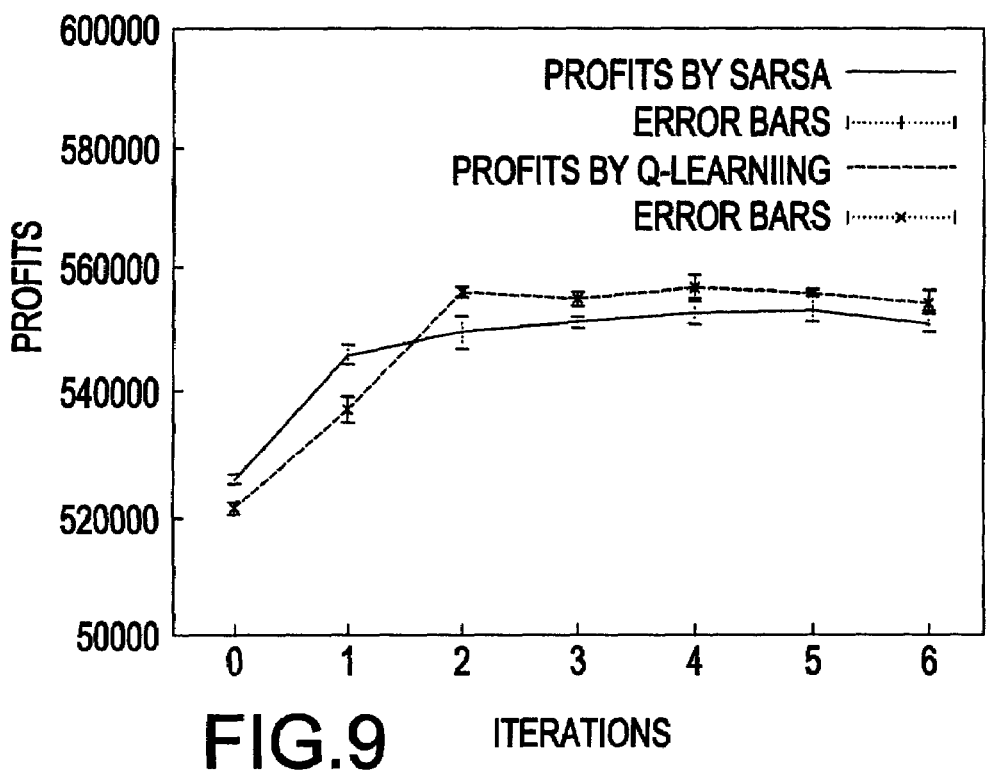
FIG. 9 illustrates total profits obtained by BatchRL (sarsa) and BatchRL(Q) according to the present invention.

Referring now to the drawings, and more particularly to FIG. 1, the present invention includes an inventive method 100 for sequential decision making (e.g., sequential cost-sensitive decision making) for customer relationship management according to the present invention.

As shown in FIG. 1, the inventive method 100 includes providing (110) customer data including stimulus-response history data (e.g., data pertaining to a customer's past response(s) to a stimulus or stimuli), and automatically generating (120) actionable (e.g., targeting) rules based on said customer data. Further, the actionable rules may be generated by estimating a value function using reinforcement learning (e.g., reinforcement learning and dynamic programming).

It should be noted that "customer data" may mean data regarding an entity that may be the subject of actionable (e.g., targeting) rules. Further, such an entity may include any entity (human or non-human) whose future behavior may be approximated, for example, based on a past experience. For instance, an individual may mean a customer (e.g., a customer of a retail store), or a client (e.g., a client of a professional service), a donor (e.g., a donor to political or other fund-raising campaign) or a legal entity such as a corporation or partnership.

The present invention effectively deals with the above-mentioned problems of conventional systems. In many practical cases, the present invention may result in a significant increase in the total profits obtained over state-of-the-art single event approach.

As noted above, a number of approaches have been developed that are effective at optimizing cost-sensitive decisions when each decision is considered in isolation. However, the issue of sequential decision making, with the goal of maximizing total benefits accrued over a period of time instead of immediate benefits, has rarely been addressed.

One of the few methods that deals with the issue of sequential targeted marketing is "horizontal marketing". Horizontal marketing applies an optimization method to design sequential targeted marketing decisions with the goal of maximizing the total profits accrued over a sequence of targeted marketing actions. Horizontal marketing, however, is global and static in nature, in the sense that the scheduling of the entire sequence of actions is to be performed at once, and the obtained targeting rules are not local in the sense that they specify the exact sequence of actions over the course of marketing actions.

It would be difficult, therefore, to translate the output of horizontal marketing into instance-in-time, if-then type rules that are commonly used in various marketing automation systems. In light of the fact that compatibility with existing marketing systems is strongly desirable, a new approach to this problem is needed, which can produce rules that can be incorporated into such systems.

The present invention includes a system and method of decision making (e.g., sequential decision-making) for customer relationship management which may apply, for example, a framework of reinforcement learning to address the issue of sequential decision making when interactions can occur among decision outcomes. Reinforcement learning refers to a class of problems and associated techniques in which the learner is to learn how to make sequential decisions based on delayed reinforcement so as to maximize cumulative rewards.

More specifically, the present invention may utilize the popular Markov Decision Process model with function approximation. In a Markov Decision Process (MDP), the environment is assumed to be in some state at any given point in time. In the case of targeted marketing, such states would be represented as feature vectors comprising categorical and numerical data fields that characterize what is known about each customer at the time a decision is made.

When the learner takes an action, it receives a finite reward and the environment makes a probabilistic transition to another state. The goal of a learner is to learn to act so as to maximize the cumulative reward it receives (usually with future rewards discounted) as the learner takes actions and traverses through the state space. In the example of targeted marketing, a customer, with all her past history of purchases and promotions, is in a certain state at any given point in time. When a retailer takes an action, the customer then makes a probabilistic transition to another state, possibly generating a reward. This process continues throughout the life of the customer's relationship with the retailer. The reward at each state transition is the net profit to the retailer. It takes into account both the purchases by the customer in response to the retailer's action and the cost of that action. The reward can thus be negative if the customer makes no purchases, which represents a net loss. Application of reinforcement learning to this problem amounts to maximizing the net present value of profits and losses over the life cycle of a customer.

As a proof of concept, the inventors tested the present invention on the well-known donation data set from the KDD Cup 1998 competition. This data set contains approximately two years of direct-mail promotional history in each donor's data record. The inventors transformed this data set and applied a reinforcement learning approach to acquire targeting rules. The results of the experiments showed that, in terms of the cumulative profits that are obtained, the present invention outperforms straightforward (repeated) applications of single-event targeting rules. The inventors also observed that the targeting rules acquired by the present invention are often more cost-containment oriented in nature as compared to the corresponding single-event targeting rules.

Specifically, the present invention may be applied to the domain of targeted marketing. However, it will be understood that the present invention is in no way limited to this application. Thus, the approach of the present invention is applicable to a wide variety of applications involving sequential decision making.

The term single-event targeted-marketing approach should be interpreted to mean an approach in which customers are selected for promotions based on maximizing the benefits obtained from each promotion when each is considered in isolation. A sequential targeted-marketing approach, by contrast, is one in which a series of promotional actions are to be taken over time, and promotions are selected for each customer based on maximizing the cumulative benefits that can be derived from that customer.

In an ideal sequential targeted-marketing approach, each decision would be made with the goal of maximizing the net present value of all profits and losses expected now and in the future. The challenge in implementing a sequential targeted-marketing approach lies in the fact that information about the future is available only in a delayed fashion. The present invention may appeal to the apparatus of reinforcement learning to resolve this difficulty.

Reinforcement Learning

As briefly explained in the introduction, the present invention may utilize the popular Markov Decision Process (MDP) model in reinforcement learning with function approximation. For an introduction to reinforcement learning see, for example, R. S. Sutton and A. G. Barto, *Reinforcement Learning: An Introduction* MIT Press, 1998; and L. P. Kaelbling, M. L. Littman, and A. W. Moore, "Reinforcement learning: A survey", *Journal of Artificial Intelligence Research*, 4, 1996. The following is a brief description of an MDP.

At any point in time, the environment is assumed to be in one of a set of possible states. At each time tick (the present invention may assume a discrete time clock), the environment is in some state s, the learner takes one of several possible actions a, receives a finite reward (i.e., a profit or loss) r, and the environment makes a transition to another state s'. Here, the reward r and the transition state s' are both obtained with probability distributions that depend on the state s and action a.

The environment starts in some initial state $s_0$ and the learner repeatedly takes actions indefinitely. This process results in a sequence of actions $$\{a_t\}_{t=0}^{\infty},$$

rewards $$\{r_t\}_{t=0}^{\infty},$$

and transition states $$\{s_t\}_{t=1}^{\infty}.$$

The goal of the learner is to maximize the total rewards accrued over time, usually with future rewards discounted. That is, the goal is to maximize the cumulative reward R, $$R = \sum_{t=0}^{\infty} \gamma^t r_t \tag{1}$$

where $r_t$ is the reward obtained at the t'th time step and $\gamma$ is some positive constant less than 1. In financial terms, $\gamma$ is a discount factor for calculating the net present value of future rewards based on a given interest rate.

Generally speaking, a learner follows a certain policy to make decisions about its actions. This policy can be represented as a function $\pi$ mapping states to actions such that $\pi(s)$ is the action the learner would take in state s. A theorem of Markov Decision Processes is that an optimum policy $\pi^*$ exists that maximizes the cumulative reward given by Equation 1 for every initial state $s_0$.

In order to construct an optimum policy $\pi^*$, a useful quantity to define is what is known as the value function $Q^\pi$ of a policy. A value function maps a state s and an action a to the expected value of the cumulative reward that would be obtained if the environment started in state s, and the learner performed action a and then followed policy $\pi$ forever after. $Q^\pi(s, a)$ is thus defined as $$Q^\pi(s, a) = E_\pi \left[ \sum_{t=1}^{\infty} \gamma^t r_t \,\middle|\, s_0 = s, a_0 = a \right] \quad (2)$$

where $E_\pi$ denotes the expectation with respect to the policy $\pi$ that is used to define the actions taken in all states except the initial state $s_0$.

A remarkable property of Markov Decision Processes is that the value function $Q^*$ of an optimum policy $\pi^*$ satisfies the following recurrence relation, known as the Bellman optimality equation:

$$Q^*(s, a) = E_r[r \mid s, a] + \gamma E_{s'} \left[ \max_{a'} Q^*\left(s', a'\right) \,\middle|\, s, a \right] \quad (3)$$

where the first term $E_r[r|s, a]$ is the expected immediate reward obtained by performing action a in state s, and the second term $E_{s'}[\max_a Q^*(s',a')|s,a]$ is the excepted cumulative reward of performing the optimum action in the transition state $s_0$ that results when action a is performed in state s.

The Bellman equation can be solved via fixed-point iteration using the following system of equations:

$$Q_0(s, a) = R(s, a) \quad (4)$$
$$Q_{k+1}(s, a) = R(s, a) + \gamma \sum_{s'} P(s' \mid s, a) \max_{a'} Q_k(s', a')$$

where R(s, a) is the expected immediate reward $E_r[r|s, a]$ and where P(s'|s, a) is the probability of ending up in state s' when action a is performed in state s. This solution method is known as value iteration. In the limit, $Q_k(s, a)$ converges to $Q^*(s, a)$ as k tends to infinity. The optimum policy is then given by $$\pi^*(s) = \operatorname{argmax}_a Q^*(s, a).$$

The use of Equation 4, however, requires knowledge of both the expected reward R(s, a) for each state-action pair as well as the state transition probabilities P(s'|s, a). In learning situations, however, these functions are unknown. The problem faced by a learner, therefore, is to infer an optimum policy (e.g., a near optimum policy) over time through observation and experimentation.

Several approaches are known in the literature. One popular reinforcement-learning method known as Q-learning, attributed to Watkins (see, e.g., C. J. C. H. Watkins, *Learning from Delayed Rewards,* PhD thesis, Cambridge University, Cambridge, 1989), is based on the Bellman equation (Equation 3) and value iteration (Equation 4). Q-learning estimates optimum value functions in an online fashion when the sets of possible states and actions are both finite. The method starts with some initial estimates of the Q-values for each state and then updates these estimates at each time step according to the following equation:

$$Q(s_t, a_t) \leftarrow Q(s_t, a_t) + \alpha(r_{t+1} + \gamma \max_a Q(s_{t+1}, a') - Q(s_t, a_t)) \quad (5)$$

It is known that, with some technical conditions, the above procedure probabilistically converges to the optimal value function (e.g., see C. J. C. H. Watkins and P. Dayan "Q-learning", *Machine Learning,* 8:279-292, 1992). The parameter $\alpha$ affects the rate of convergence of the update rule, as well as the asymptotic residual error in the estimate of the value function as the time step t tends to infinity. In order to obtain both a fast rate of convergence (which requires $\alpha$ to be large) and small asymptotic estimation error (which requires $\alpha$ to be small), the value of $\alpha$ is usually set up to be a decreasing function of time t. To ensure convergence, it is also necessary to repeatedly try every action in every reachable state in order to accurately estimate the value function for every state-action pair.

The policy that is followed during Q-learning should, therefore, balance the need to explore the state space (in order to ensure convergence) against the goal of maximizing cumulative rewards over time. One approach for achieving such a balance, known as the $\epsilon$-greedy method, is to employ a stochastic policy that chooses an action at random with probability $\epsilon$, and that otherwise follows the policy given by the following update equation with probability $(1-\epsilon)$:

$$\pi(s_t) \leftarrow \operatorname{argmax}_a Q^\pi(s_t, a) \quad (6)$$

As each action is performed, Equation 5 is first used to update the Q-value for the state just visited, and Equation 6 is then used to update the action that is to be taken (with probability $(1-\epsilon)$) the next time that state is visited. Equation 6 is also used to define the initial policy given the initial Q-value estimates by applying the update to all possible states. As with $\alpha$, the value of $\epsilon$ is usually set up to be a decreasing function of t.

One drawback of Q-learning is that it has a tendency to aggressively pursue what appears to be the best possible policy based on current knowledge, even though parts of the state space have not yet been thoroughly explored. Sutton and Barto (e.g., see R. S. Sutton and A. G. Barto. *Reinforcement Learning: An Introduction,* MIT Press, 1998.) provide an illustrative example of the consequences of this behavior wherein a simulated robot using $\epsilon$-greedy Q-learning repeatedly runs itself off a cliff in order to better estimate the exact shape of the cliff edge in an attempt to find the best possible path to a goal state.

Another popular learning method, known as sarsa (e.g., see G. A. Rummery and M. Niranjan "On-line q-learning Using Connectionist Systems", Technical Report CUED/F-IN-FENG/TR 166, Cambridge University Engineering Department, 1994, Ph.D. thesis), is less aggressive than Q-learning in the assumptions it makes about the current knowledge of the state space. Like Q-learning, Sarsa-learning starts with some initial estimates for the Q-values that are then dynamically updated, but the update rule is somewhat different:

$$Q(s_t,a_t) \leftarrow Q(s_t,a_t)+\alpha(r_{t+1}+\gamma Q(s_{t+1},a_{t+1})-Q(s_t,a_t)) \qquad (7)$$

In particular, there is no maximization over possible actions in the transition state $s_{t+1}$. Instead, the current policy $\pi$ is used without updating to determine both $a_t$ and $a_{t+1}$.

When the policy is not updated but is held fixed, it can be shown, with some technical conditions, that Equation 7 will probabilistically converge to the value function for the given policy. When the policy is updated according to Equation 6 in combination with $\epsilon$-greedy search, improvements are made to the policy, but without the aggressive assumptions made by Q-learning.

Batch Reinforcement Learning with Function Approximation

In the foregoing description of reinforcement learning, two simplifying assumptions were made that are not satisfied in the current setting. The first assumption is that the problem space consists of a reasonably small number of atomic states and actions. Both the sarsa and Q-learning methods described above perform value updates for each state-action pair, which requires that the number of such pairs be finite. In many practical applications, including targeted marketing, it is natural to treat the state space as a feature space with a large number of both categorical and real-valued features. In such cases, the state space is prohibitively large to represent explicitly, which renders the above methods impractical.

The second assumption that was made is the availability of online interaction with the environment. In applications like targeted marketing, this situation is typically not the case. In fact, it is quite the opposite. In targeted marketing, one usually has access to a very large amount of data accumulated from past transaction history from which an effective targeting strategy is to be derived. Moreover, the targeting strategy (i.e., the policy) must make simultaneous decisions for an entire population of customers, riot one customer at a time. Online learning of policies, via reinforcement learning or otherwise, is not practical under these circumstances.

Bearing these factors in mind, the inventors propose to use so-called batch reinforcement learning methods with function approximation. Batch reinforcement learning refers to a form of reinforcement learning in which the learning does not take place in an online fashion as the learner performs actions and the environment traverses states. Instead, batch learning makes use of a potentially large volume of static training data that represents prior experience. The training data consists of sequences of states, actions, and resulting rewards. Batch learning thus reflects the realities of certain real-world applications like targeted marketing.

Function approximation amounts to representing the value function as some reasonable function of state features and actions (e.g., see D. P. Bertsekas and J. N. Tsitsiklis, *Neuro-Dynamic Programming*, Athena Scientific, 1996; J. N. Tsitsiklis and B. V. Roy. "An Analysis of Temporal Difference Learning With Function Approximation", *IEEE Transactions on Automatic Control*, 42(5):674-690, 1997; and X. Wang and T. Dietterich, "Efficient value function approximation using regression trees", *Proceedings of the IJCAI Workshop on Statistical Machine Learning for Large-Scale Optimization*, 1999). The usual online learning approach, by contrast, assigns explicit values to explicit state-action pairs. For targeted marketing purposes, the state features can include everything that is known about a customer, such as demographic information and past transaction history.

Given such training data, batch reinforcement learning with function approximation attempts to estimate the value function Q(s, a) by reformulating value iteration (i.e., Equation 4) as a supervised learning problem. In particular, on the first iteration, an estimate of the expected immediate reward function R(s, a) is obtained by using supervised learning methods to predict the value of R(s, a) based on the features that characterize the input state s and the input action a. On the second and subsequent iterations, the same supervised learning methods are used again to obtained successively improved predictions of Q(s, a) by using variants of sarsa (Equation 7) or Q-learning (Equation 5) to recalculate the target values that are to be predicted for each iteration.

Referring again to the drawings, FIGS. 2 and 3 provide possible pseudo-code for two versions of batch reinforcement learning, one based on sarsa (FIG. 2), the other based on Q-learning (FIG. 3). In both cases, the input training data D is assumed to include (e.g., consist of), or contain enough information to recover, episode data. An episode is a sequence of events, where each event consists of a state, an action, and a reward. Episodes preserve the temporal order in which events are observed. States $s_{t,j}$ are feature vectors that contain numeric and/or categorical data fields. Actions $a_{t,j}$ are assumed to be members of some pre-specified finite set. Rewards $r_{t,j}$ are real-valued. The base learning module, Base, takes as input a set of event data and outputs a regression model $Q_k$ that maps state-action pairs (s, a) to their estimated Q-values $Q_k(s, a)$. In the two procedures shown in these figures, and in all variants considered later herein, $\alpha k$ is set to be $\alpha/k$ for some positive constant $\alpha<1$.

It should be noted that the only difference between the two methods is the equation that is used to recalculate target Q-values at each iteration. In the case of FIG. 2, Equation 7 is used and in the case of FIG. 3, Equation 5 is used.

Base Regression Method

As a base learning method, the present invention may employ any regression method including, for example, a multivariate linear-regression tree method implemented in the ProbE data mining engine (e.g., see, R. Natarajan and E. Pednault, "Segmented Regression Estimators for Massive Data Sets", *Second SIAM International Conference on Data Mining*, Arlington, Va., 2002; and C. Apte, E. Bibelnieks, R. Natarajan, E. Pednault, F. Tipu, D. Campbell, and B. Nelson, "Segmentation-based Modeling for Advanced Targeted Marketing", *Proceedings of the Seventh ACM SIGKDD International Conference on Knowledge Discovery and Data Mining (SIGKDD)*, pages 408-413. ACM, 2001). This learning method produces decision trees with multivariate linear regression models at the leaves. Regression models are constructed as trees are built, and splits are selected to maximize the predictive accuracies of the regression models in the resulting child nodes. Feature selection is performed as part of both the tree building process (i.e., split selection) and the regression modeling process (i.e., variable selection). Likewise, pruning is performed both on the trees and on the regression models at the nodes.

In their experiments, the inventors compared the conventional single-event targeting strategy of selecting customers for each marketing campaign so as to maximize the profit of each campaign when viewed in isolation, versus the proposed sequential targeting strategy of selecting campaigns for each customer so as to maximize the cumulative profits generated by each customer. To ensure a fair comparison, ProbE's multi-variate linear-regression tree method was used to construct models for both targeting strategies. A single-event targeting strategy was constructed by applying the procedure shown in FIG. 2 with final set to a value of zero. Doing so causes the reinforcement learning loop at line 4 to be omitted, thereby producing a policy that maximizes immediate reward. Because the same base learning algorithm is used for constructing both single-event and sequential marketing strategies, any differences in performance that are observed should reflect inherent differences in the strategies.

Sampling for Enhanced Scalability

An important issue in any data mining application is that of scalability. This is especially important in applying the present invention to domains like targeted marketing. Not only can the volume of the business transaction data be huge (e.g., well over millions of records), but the iterative nature of reinforcement learning requires generating a sequence of models from such data.

In an effort to lighten the load of data size, the inventors considered a series of sampling methods that are specifically designed for batch reinforcement learning. One obvious approach is random sampling. However, more efficient sampling methods can be obtained by taking into account the episodic nature of the data and the objectives of the learning strategy.

It should be recalled that in batch reinforcement learning, training is performed on data that have already been collected, presumably using some sampling or control policy. This is to be contrasted with the online learning setting, in which the learner has control over the sampling policy. However, in domains that involve a potentially huge amount of data, it is possible to simulate online reinforcement learning with a particular policy by electing to use just those data that conform to the policy.

Based on this latter idea, the inventors propose a sampling method they call Q-sampling in which only those states are selected that conform to the condition that the action taken in the next state is the best action with respect to the current estimate of the Q-value function. The value update is akin to Equation 7 used in sarsa-learning, but the effect of the learning that occurs corresponds to Equation 5 used in Q-learning because the sampling strategy ensures that $$Q(s_{t+1}, a_{t+1}) = \max_a Q(s_{t+1}, a').$$

Taking this line of reasoning a step further, it is also possible to look ahead an arbitrary number of states and select only those states in which optimal actions are taken in all of those subsequent states. In this case, it makes sense to take advantage of the lookahead that is being done for updating the Q-value. There is a well-known method of value update with lookahead known in the literature as TD($\lambda$). This method updates the value function estimate using a weighted average of the Q-value estimate from the last state and the discounted partial sums of rewards obtained over the next several states. More precisely, TD($\lambda$) uses the following update rule for estimating Q-values:

$$Q(s_t, a_t) \leftarrow Q(s_t, a_t) + \alpha \left( \overset{\lambda}{R}t - Q(s_t, a_t) \right) \quad (8)$$

where $$\overset{\lambda}{R}t = (1 - \lambda) \sum_{n=1}^{\infty} \lambda^{n-1} R_t^{(n)}$$

and where $R^{(n)}_t$ is the so-called n-step return defined as follows.

$$R_t^{(n)} = r_{t+1} + \gamma r_{t+2} + \ldots + \gamma^n Q(s_{t+n}, a_{t+n})$$

The inventors employed this update rule in their sampling method based on multistep lookahead and, thus, named it TD($\lambda$)-sampling.

Examples of pseudo-code for the above three sampling methods is presented in FIGS. 4, 5, and 6. Specifically, FIG. 4 provides possible pseudo-code for one version of batch reinforcement learning for random sampling, FIG. 5 provides pseudo-code for one version of batch reinforcement learning for Q-sampling, and FIG. 6 provides possible pseudo-code for one version of batch reinforcement learning for TD($\lambda$)-sampling.

The Q-sampling and TD($\lambda$)-sampling strategies are presented as variants of the basic random sampling method shown in FIG. 4. It should be noted that different random samples are selected at each iteration at line 4.1 of these algorithms. This is done to reduce overfitting effects as updated Q-value functions are learned at line 4.3.

Experiments

As mentioned above, the inventors performed preliminary evaluation experiments using an existing benchmark data set in the general domain of targeted marketing, and using simulation. The inventors used the well-known donation data set from KDD Cup 1998, which contains demographic as well as promotion history data as episode data. The episode data are used in two ways: (1) A series of event data are generated from the episode data and are used for reinforcement learning to obtain a targeting policy; (2) Models of response probability and donation amount are estimated using similar event data generated from the episode data, which are used to obtain an MDP simulation model. This MDP model may then be used to run simulation experiments for evaluating the acquired targeting policy.

The Data Set

The donation data set used by the inventors in their experiments from the KDD Cup 1998 competition is available from the UCI KDD repository (e.g., see S. D. Bay, UCI KDD archive, Department of Information and Computer Sciences, University of California, Irvine, 2000 (http://kdd.ics.uci.edu/)) along with associated documentation. This data set contains information concerning direct-mail promotions for soliciting donations. The information includes demographic data as well as promotion history for 22 campaigns that were conducted monthly over an approximately two year period. The campaign information includes whether an individual was mailed or not, whether he or she responded or not, and how much was donated. Additionally, if the individual was mailed, the date of the mailing is available (month and year), and if the individual then responded, the date of the response is available.

The inventors used the training data portion of the original data set, which contains data for approximately 100 thousand selected individuals (This is contained in "cup98lrn.zip" on the URL "http://kdd.ics.uci.edu/databases/kddcup98/kddcup98.html"). Out of the large number of demographic features contained in the data set, the inventors selected only age and income bracket. Based on the campaign information in the data, the inventors generated a number of temporal features that are designed to capture the state of that individual at the time of each campaign. These features include the frequency of gifts and promotions, the recency of gifts and promotions, the number of recent promotions in the last 6 months, etc., and are summarized in Table 1 which is provided in FIG. 7.

It should be noted that, because a 6 month history window is used to summarize recent promotion-response behavior, the first 6 monthly campaigns present in each data record are reserved as the first 6-month history window when extracting feature vectors. Hence, only the last 16 of the 22 campaigns were used for episode data.

It should also be noted that many of these features are not explicitly present in the original data set, but instead are computed from the data by traversing through the campaign history data. In the terminology of general batch reinforcement learning explained above, the demographic and campaign history data for each individual constitute an episode, from which the sequence of events—state, action and reward triples—may be recovered.

For example, the feature named numprom in the original KDD Cup data takes on a single value for each individual, and equals the total number of promotions mailed to that individual prior to the last campaign. In the inventor's case, numprom was computed for each campaign by traversing the campaign history data backwards from the last campaign and subtracting one every time a promotion was mailed in a campaign. Similarly, ngiftall in the original data set is just the total number of gifts to date as of the last campaign, but here this was computed for each campaign by starting at the last campaign and subtracting one each time a gift was made.

It should be noted that the inventors did not make use of the RFA codes included in the original data, which contain the so-called Recency/Frequency/Amount information for the individuals, since they did not contain enough information to recover their values for campaigns that were not mailed to the individuals.

Evaluation by Simulation

The inventors evaluated their approach via simulation using an estimated MDP for the donation data set. The MDP constructed consists mainly of two estimation models: one model P(s, a) for the probability of response as a function of the state features and the action taken, and the other A(s, a) for the amount of donation given that there is a response, as a function of the state features and the action. The P(s, a) model was constructed using ProbE's naive-Bayes tree algorithm, while A(s, a) was constructed using ProbE's linear-regression tree algorithm.

Given models for P(s, a) and A(s, a), it is possible to construct an MDP in the following way. First, the immediate reward r(s, a), for a given state, action pair can be specified using the two models as follows: Flip a coin with bias P(s, a) to determine if there is a response. If there is no response, then the amount of donation is zero. If there is a response, then determine the amount of donation as A(s, a).

The reward obtained is the amount of donation minus the mailing cost, if any. Next, the state transition function can be obtained by calculating the transition of each feature using the two models. For example, ngiftall (number of gifts to date) is incremented by one if the above coin with bias P(s, a) came up heads; otherwise, it remains unchanged. Similarly, numprom (e.g., number of promotions to date) is incremented if the action taken was 1, and remains constant otherwise. Using the above two features, frequency (i.e., ngiftall/numprom) can be computed. Updates for other features are computed similarly.

Given the above functional definition of an MDP, the inventors conducted their evaluation experiment as follows. Initially, the inventors selected a large enough subset (5,000) of the individuals, and set their initial states to correspond to their states prior to a fixed campaign number (in experiments reported herein, campaign number 7 was used). The inventors then threw all these individuals to the MDP and use the value-function output of their batch reinforcement learning procedure to make decisions about what actions to take for each individual. Utilizing the response probability model and the expected amount model, the inventors computed the resulting rewards and next states. The inventors recorded the rewards thus obtained, and then went on to the next campaign. The inventors repeated this procedure 20 times, simulating a sequence of 20 virtual campaigns.

The use of a simulation model for evaluation raises a question concerning the inventors' premise that online interaction with an MDP is infeasible. A natural inclination may be to use the above MDP as a model of the environment, and use an online learning method (such as online versions of sarsa and Q-learning) to estimate the value function from interactions with it. The inventors' view is that the human behavior in application domains such as targeted marketing is too complicated to be well captured by such a simplified model of MDP. The inventors are using the simulation model to evaluate the policy obtained by their method, only as a preliminary experiment prior to a real-world evaluation experiment.

Experimental Results

The inventors reported on the results of our preliminary experiments using a simulation model. The inventors evaluated their proposed approach with respect to a number of performance measures, including the total life-time profits obtained and the qualitative behaviors of the acquired targeting rules.

Life-Time Profits

The inventors first considered the most obvious measure (and one of most important measures) of total cumulative benefits (e.g., life-time profits) obtained by the competing methods. In particular, the inventors compared the life-time profits obtained by two variants of reinforcement learning to that obtained by the single-event targeting method. Here, the single-event method is obtained by using the base regression module to learn a model of the expected immediate rewards (profits) as a function of state features and the action, and then mailing to an individual just in case the expected immediate reward for mailing exceeds that for not mailing, at each campaign. Notice that, since the state features contain temporal information, such as recency, frequency, and the number of recent promotions, the targeting decisions obtained this way are sensitive to the past history and, hence, to the campaign number.

FIG. 8 shows the total life-time profits obtained by the sarsa-learning version of batch reinforcement learning, plotted as a function of the number of value iterations performed. The plots were obtained by averaging over 5 runs, each run with episode data size 10,000, which translates to training data size of 160,000 for reinforcement learning (i.e., 10,000 episodes times 16 campaigns). The total profits are obtained using the simulation model as described in the previous section, and totaled over 20 campaigns. The error bars shown in the graph are the standard errors calculated from the total profits obtained in the five independent runs, namely $$\sigma = \sqrt{\frac{\sum_{i=1}^{n}(P_i - \overline{P})^2 / n - 1}{n}} \quad (9)$$

where Pi is the total profit obtained in the i-th run, $\overline{P}$ is the average total profit, and n is the number of runs (5 in this case). Note that the iteration number "0" corresponds to the single-event targeting method. Thus, the total life-time profits obtained in later iterations represent statistically significant improvements over the single-event approach.

Next, the inventors compared the total profits obtained by different versions of batch reinforcement learning methods, sarsa and Q-learning. FIG. 9 shows the total profits obtained by these two versions, again using 10,000 episode data and averaged over five runs. These results show that, in this particular case, Q-learning resulted in a more profitable policy than sarsa-learning, although the statistical significance of the difference was unconvincing with the inventors' limited experimentation.

This is indeed not surprising considering that Q-learning attempts to obtain the optimal policy, whereas sarsa-learning is trying to perform a local improvement based on the current policy. In the context of batch reinforcement learning, this current policy is in fact the policy that was used in practice when the data was obtained.

Rule Behavior: Number of Mailings

Figure 10:
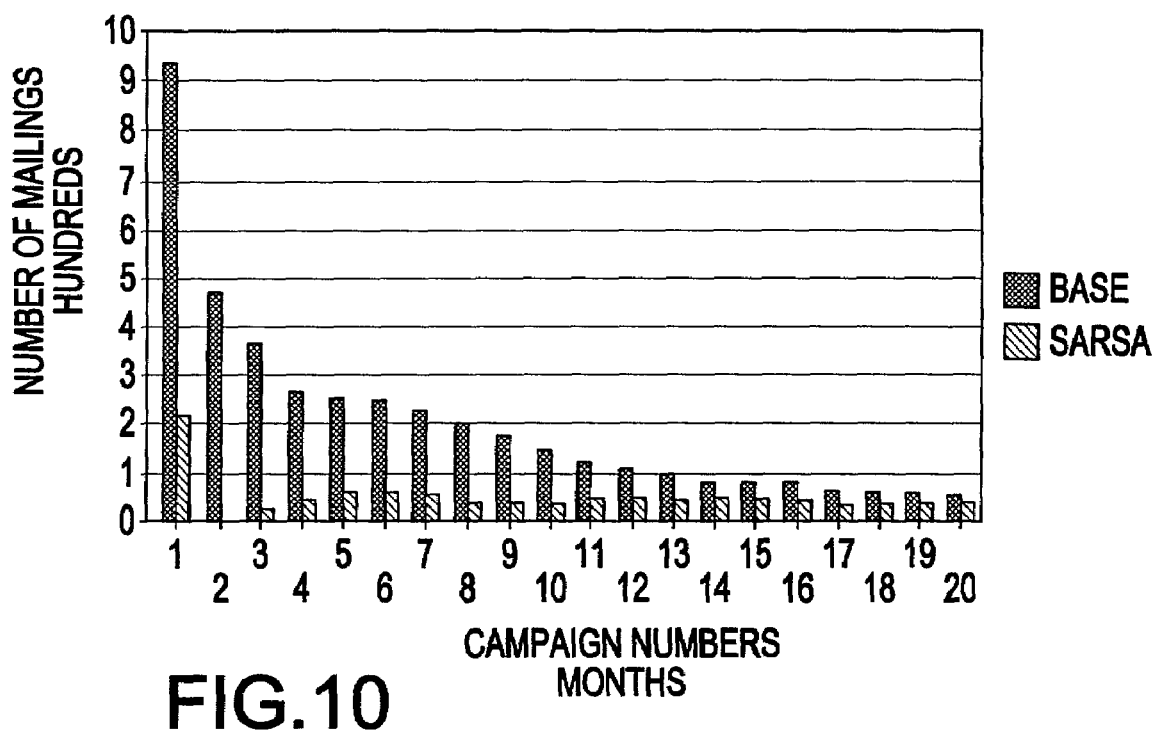
FIG. 10 illustrates the number of mailings by a policy obtained by BatchRL(sarsa) according to the present invention.

In addition to analyzing the profits that were attained, the inventors also examined how the behavior of the obtained models differ. FIG. 10 shows the number of individuals mailed in each of the twenty campaigns. The number of individuals considered in each campaign was 10 thousand for this experiment. Clearly, the policy obtained by sarsa-learning is significantly more cost-containment oriented than the policy produced by the single-event strategy.

It is also interesting to note that the model produced by reinforcement learning seems to exhibit rather sophisticated temporal characteristics. That is, it initially mails to a large number of individuals, waits to observe the responses, and then starts sending again to very selected segments. This type of sequential targeting strategy seems to make sense intuitively, but it also appears highly unlikely that a real-world retailer actually employs a strategy like this. It appears to be a rather surprising and non-trivial discovery made by the inventors' approach to sequential targeted marketing.

The inventors also examined the policy obtained by the Q-learning version of batch reinforcement learning. In many cases, it was outputting policies that mail to almost all individuals. It was indeed the case that the simulation model the inventors used was crediting even more profits to this strategy (It should be noted that this is not as unlikely as it may seem. The KDD Cup 98 data set contains data about individuals who used to actively contribute and then stopped being active. The test data used for the cup competition was the data for the last campaign. So the models were trying to find a strategy that somehow determines who among these defectors are likely to be won back. This is not the case in the inventors' simulation. The inventors took a certain campaign number in the first half of the two years, when most individuals were still active, and then started simulating from there.).

Since Q-learning deviates more from the current policy and searches for a global optimum, it appears to have found a policy that was significantly different in nature from the current policy but was more profitable. Sarsa-learning, on the other hand, works more closely with the current policy and tries to improve it, and as a result it seems to obtain a similar policy to the current one, but is more cost-containment oriented and is more practical.

The profitability of a policy is obviously an important criterion in the choice of marketing strategies in targeted marketing. There are, however, other considerations that impact decision making in practice. Observations such as the one made above may prove that, in practice, the more conservative sarsa-learning may be more readily accepted than the more aggressive Q-learning method.

Rule Behavior: Profits per Campaign

To determine how it is possible that the cost-containment oriented policies generated by the inventors' reinforcement learning can approach achieve greater profits, the inventors examined how the amount of profits obtained changes over time as the campaigns proceed. FIG. 11 shows the profits obtained by each policy per campaign, for the twenty campaigns considered in the simulation. In the graph, it is clearly seen that the policy produced by the reinforcement learning approach is settling for lower profits initially in order to achieve greater profits in later campaigns. This is an indication that the reinforcement learning approach, which takes into account the long-term effects, is indeed successful at finding targeting rules that maximize life-time profits rather than immediate profits.

Note also that profits are obtained during campaign 2 even though almost no one was mailed during this campaign. These profits represent delayed responses to previous campaigns that had already been mailed. Thus, donations are credited to the months in which they received, not to the campaigns that triggered those donations. This delayed-response approach to credit assignment is important in order to correctly formulate sequential decision making as a Markov decision process.

Comparison of Sampling Methods

Figure 13:
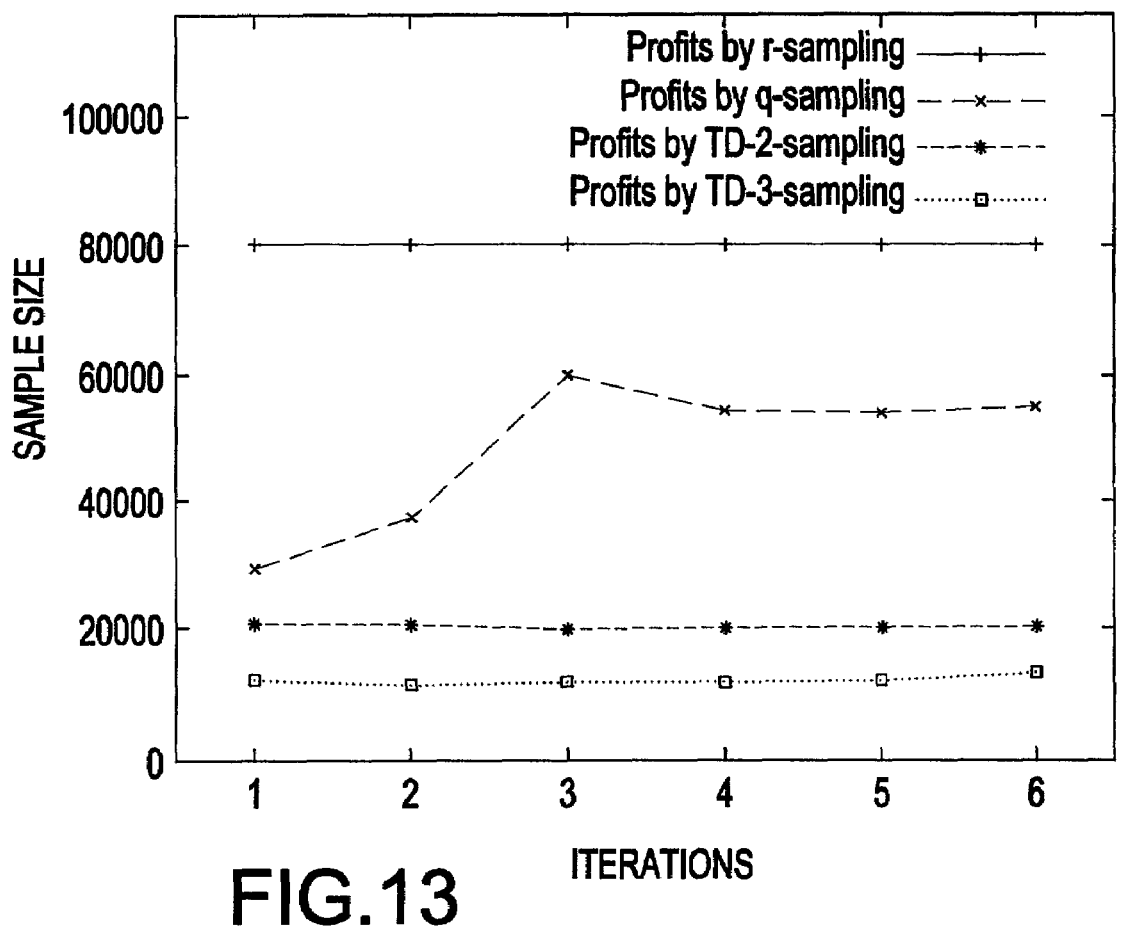
FIG. 13 illustrates sample size for competing sampling methods as a function of value iteration number.

The inventors also conducted experiments to examine the effect of using the various sampling methods proposed hereinabove with respect to the quality of the output models and the required computational resources. FIG. 12 plots the total life-time profits attained using different sampling methods as a function of the number of value iterations that were performed. The sampling methods employed were random sampling, Q-sampling, TD($\lambda$)-sampling with 2-step lookahead, and TD($\lambda$)-sampling with 3-step lookahead. Similarly, FIG. 13 shows how the sample size (i.e., the number of data records selected at each iteration) changes as a function of the iteration number. In these experiments, an episode data set of size 10,000 was used, and in each iteration 5,000 out of them were randomly sampled, resulting in 80,000 event data. The latter three sampling methods further reduced the sample size by filtering out those data that did not meet the respective conditions (as specified in FIGS. 5 and 6.)

Comparing these two graphs clearly shows the advantage of the proposed sampling methods. That is, confining the training data to those that conform to the currently estimated greedy policy can result in a substantial saving in the sample size and therefore in the required computational resources (time and space), without compromising the quality of the output model in terms of the total life-time profits obtained. In fact, the three sampling methods resulted in more profitable policies in these particular experiments. As one increases the number of lookahead steps by one (1 for Q-sampling, 2 for TD-2, and 3 for TD-3), the sampling size is roughly cut in half. This is natural considering that there are two possible actions (mail or do not mail), and only one of them conforms to the current policy. In many practical applications, there are likely to be a large number of possible actions to choose from. In such cases, one can expect correspondingly large savings in computational resources.

In short, the present invention includes a method for optimized sequential targeted marketing. The method may include preparing data, estimating a value function, and transforming rules. Data preparing may include using customer data such as demographic features, transaction history data such as purchase records, web, wireless, kiosk access data, call center records, which may be used to generate a sequence of event data, where each event datum consists of demographic features of a customer, if any, and a number of features of the same customer which collectively reflect the state of that customer at a certain point in time. Such features may be derived from the customer's transaction history data (e.g., the number of purchases made to date, number of purchases made in recent months, the amount of purchases made, the amount of purchases made recently, the frequency of web access, frequency of web access made recently, possibly categorized by the types of web pages, etc.). Such data may also include the marketing action which may be taken at or around that time by the seller (e.g., retailer), the response may be taken by that customer at or around that time, and the amount of profit or cost associated with that action, if available.

Estimating a value may include using data generated by the data preparation, invoking a process known as the "value iteration" in the area of reinforcement learning and dynamic programming, and making use of a regression method, in order to estimate the so-called "value function" (e.g., the expected cumulative reward for any action in any given state, i.e. a set of values assumed by the above mentioned customer features, and outputs a model representing the value function).

The method for optimized targeted marketing may also include transforming the model of value function into a set of targeting rules, which outputs a set of if-then style targeting rules that specifies what actions to take, given a set of feature values corresponding to the present customer. The transformation may output targeting rules that specify an action that corresponds to the action with the maximum value according to the value function for a given set of feature values.

The transformation may also include generating training data using the model of value function, each of which consists of a set of feature values, the action that corresponds to the maximum value for that set of feature values, and then using a classification (or supervised learning) method to output a set of targeting rules that conform to the training data.

The method for optimized sequential targeted marketing may also include selecting data. For instance, the value estimating may repeatedly call a data selection module once or more per each iteration of the so-called value iteration. The data selection module may access the customer and transaction history data set possibly stored in a database or other data storage device, and select a restricted subset for use for value function estimation, by making use of the data preparation module applied in a piecemeal fashion.

For example, the method may use one (e.g., at least one) of the following selection criteria: 1) select only those events such that their "next" states satisfy the condition that the action taken correspond to the action with the maximum estimated cumulative value, with respect to the estimated value function from the previous value iteration, 2) select only those events such that their next n states satisfy the condition that the action taken in each state correspond to the action with the maximum estimated cumulative value, 3) select only those events such that their current states satisfy the condition that the action taken correspond to the action with the maximum estimated cumulative value, with respect to the estimated value function from the previous value iteration, 4) select only those events such that their current and the next n states satisfy the condition that the action taken correspond to the action with the maximum estimated cumulative value, with respect to the estimated value function from the previous value iteration, and 5) select only those events such that their current states satisfy the condition that the action taken correspond to the action with the maximum upper bound of estimated cumulative value, i.e. predicted value plus a constant factor times the standard deviation of that estimate, with respect to the estimated value function from the previous value iteration.

Further, the n-step look ahead may be used in the value function update procedure within the value estimation module, known in the reinforcement learning literature as a "TD-lambda" update rule, in combination with the selective sampling method with n-step look ahead.

Further, the data preparing may include using transaction history data from multiple channels. In this case, a data selection may include accessing a number of channel specific databases, and forming an effective join (e.g., joining) of these data using a form of customer identification as a key. Thus, the data selection may be applied to the resulting data, and obtain data used for subsequent value estimation.

It should be noted that there the present invention may utilize alternatives to "value iteration" to achieve comparable goals. For instance, the present invention may utilize, "policy iteration" and indirect reinforcement learning methods. These methods are analogous to "value iteration" in the sense that they output rules that are nearly optimal with respect to the same criterion (maximizing cumulative profits), but they both require a "simulation model", which is an estimated MDP model of the environment.

Effects of the Present Invention

As compared to conventional methods (e.g., single-event targeted marketing methods), which attempt to maximize the profits for each action in isolation, the present invention can result in actionable (e.g., targeting) rules that achieve significantly more cumulative profits over time. This has been demonstrated by the inventors using some bench mark data.

Further, the present invention can generate channel-specific targeting rules which take into account later profits expected in other channels, thereby resolving the problem of great concern among the practicing retailers that a uniform view of the customer is desired across multiple (e.g., a plurality of) channels In addition, the obtained targeting rules may be instance-in-time and channel-specific rules, which are optimized over time and across channels. The present invention is, therefore, robust to changes in the environment, and is compatible to existing rules engines in automated marketing systems.

The present invention is likely to offer a strong differentiating factor to current offerings in the area of CRM and business intelligence, particularly in the distribution sector. The present invention is also compatible with systems for running web commerce infrastructure. Further, the present invention may generate targeting rules that better serve the customers' need and increase their loyalty.

System

Figure 14:
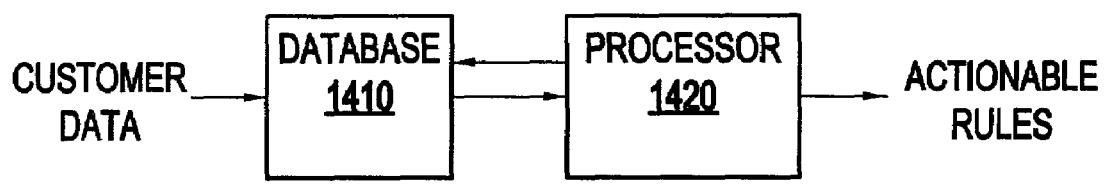
FIG. 14 illustrates a system 1400 for sequential decision making for customer relationship management according to the present invention.

Referring again to the drawings, FIG. 14 illustrates an inventive system 1400 for sequential decision making for customer relationship management according to the present invention. As shown in FIG. 14, the inventive system 1400 includes a database 1410 for storing customer data. As noted above, such data may include, for example, age, income, gender, etc., and stimulus-response history data. The system 1400 also includes a processor 1420 for automatically generating actionable (e.g., targeting) rules based on the customer data. Specifically, the processor 1420 may generate the actionable rules by estimating a value function using reinforcement learning (e.g., reinforcement learning and dynamic programming).

An Exemplary System

Figure 15:
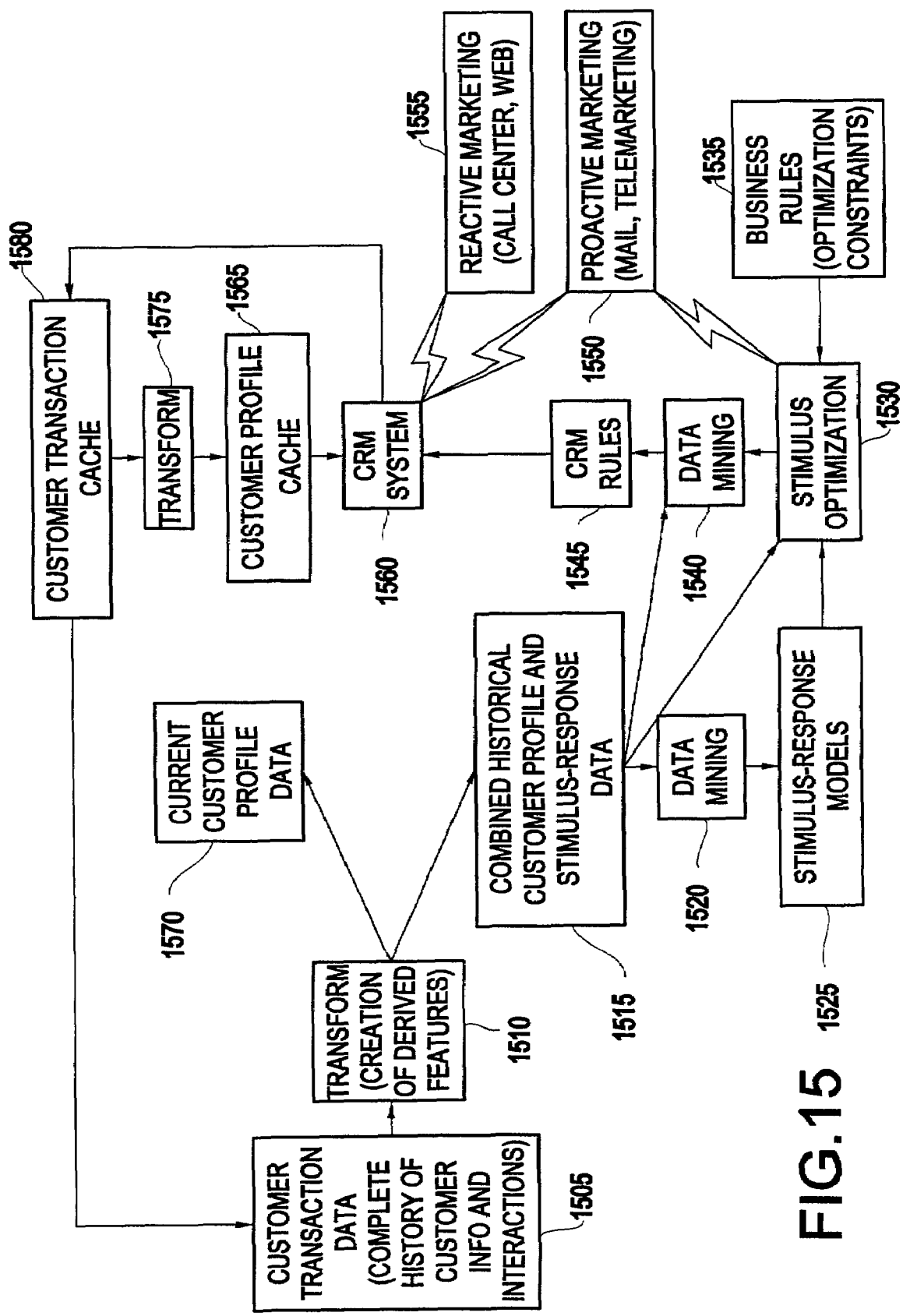
FIG. 15 illustrates an exemplary embodiment of the system for sequential decision-making for customer relationship management according to the present invention.

FIG. 15 illustrates one example of a system according to present invention. In this example, targeted marketing rules are automatically generated for customers. As shown in FIG. 15, the customer transaction data (1505) are transformed to create derived features (1510). These features are used to develop current customer profile data (1570) and combined historical customer profile and stimulus response data (1515). Data mining (1520) is performed on this data (1515) to develop stimulus-response models (1525).

Further, the combined historical customer profile and stimulus-response data and stimulus-response models (1525) are used with business rules (1535) to perform stimulus optimization (1530). Data mining (1540) is again performed on the data (1515) and stimulus optimization (1530) to generate customer relationship management (CRM) rules (1545) to be input to the CRM system (1560).

In addition, a customer transaction cache (1580) is transformed (1575) and used with the current customer profile data (1570) to generate a customer profile cache (1565) which is input to the CRM system (1560). Further, two forms of marketing, reactive marketing (1555) and pro-active marketing (1550) are applied in the system. Further, the CRM system (1560) updates the customer transaction cache 1580 which is used to update the customer transaction data (1505).

More specifically, block 1515 of FIG. 15 is an exemplary embodiment of block 1410 of FIG. 14. Further, blocks 1505, 1510, and 1515 of FIG. 15 taken together comprise an exemplary embodiment of block 110 of FIG. 1.

In addition, blocks 1520, 1525, 1530, 1535, and 1540 comprise an exemplary embodiment of block 120 of FIG. 1, and of block 1420 of FIG. 14, the output of which is depicted as block 1545 of FIG. 15.

Further, the above-described reinforcement-learning method may be used to implement blocks 1520, 1525, and 1530. In addition, the reinforcement-learning method presented can be further enhanced to take business rules (1535) into account by using business rules to restrict the set of allowable actions that are considered during reinforcement learning. For example, business rules could be applied to select a subset of allowable actions over which maximums are calculated in Equation 4, in Equation 5, in line 4.1.1.1 of FIG. 3, in the if-statement immediately following line 4.1.2 in FIG. 5, and in the if-statements immediately following line 4.1.2 in FIG. 6. Examples of such business rules may include "don't offer credit to a customer with a credit rating less than X", "only preferred customers can receive promotion Y," "only new customers can participate in promotion Z," and "seasonal catalogs cannot be mailed out of season."

In addition, the value-function output of reinforcement learning can be utilized directly to make targeting decisions by calculating maximums over actions as per Equation 6, where the set of allowable actions are defined by business rules (1535) that are applied to state feature vectors $s_t$ in Equation 6.

Alternatively, the targeting decisions can be compiled into a set of if-then rules by applying Equation 6, subject to business rules (1535) as described above, in order to calculate a best marketing action to take for each training data record in the historical database (1515). A suitable data mining method (1540), such as a decision tree method, can then be applied to construct if-then CRM rules (1543) from the historical database (1515) using the best marketing action calculated for each training data records as the target data field that is to be predicted. The resulting CRM rules will then predict the best marketing action to take as a function of a customer's profile data, subject to business rules (1535). Moreover, the CRM rules will be of the form "if a customer's profile data meets such-and-such conditions, then take such-and-such marketing action." This form is highly compatible with rule-based CRM systems (1560)(e.g., existing rule based CRM systems).

Further, blocks 1560, 1565, 1575, and 1580 represent an exemplary embodiment of an operational CRM system for utilizing the targeting rules that are produced by the invention. This operational CRM system is depicted as having its own transaction (1580) and profile (1565) data caches in order to enhance its run-time execution speed by reducing the number of queries that would otherwise have to be issued against the main database (1505) if the data caches were not present.

Cross-Channel Optimized Marketing (CCOM)

Targeted marketing has traditionally been done most often in the channel of direct mailing. Recent development and prevalence of IT based marketing has widened this common practice to a variety of additional channels, including the Internet, the kiosk, the wireless, the store, and the call center. In this renewed, so-called "cross-channel" retail setting, it is even more important to consider the optimization of sequences of marketing actions, as now the actions are not only taken at different points in time, but also across different channels over time.

The present invention may be applied, for example, in the cross-channel setting, and is able to optimize channel-specific targeting rules so as to maximize the total cross-channel profits. As part of the present invention, techniques to ensure efficient and effective application may be included, even in the cross-channel setting requiring integration of large volumes of customer and transaction data across multiple channels.

Figure 16:
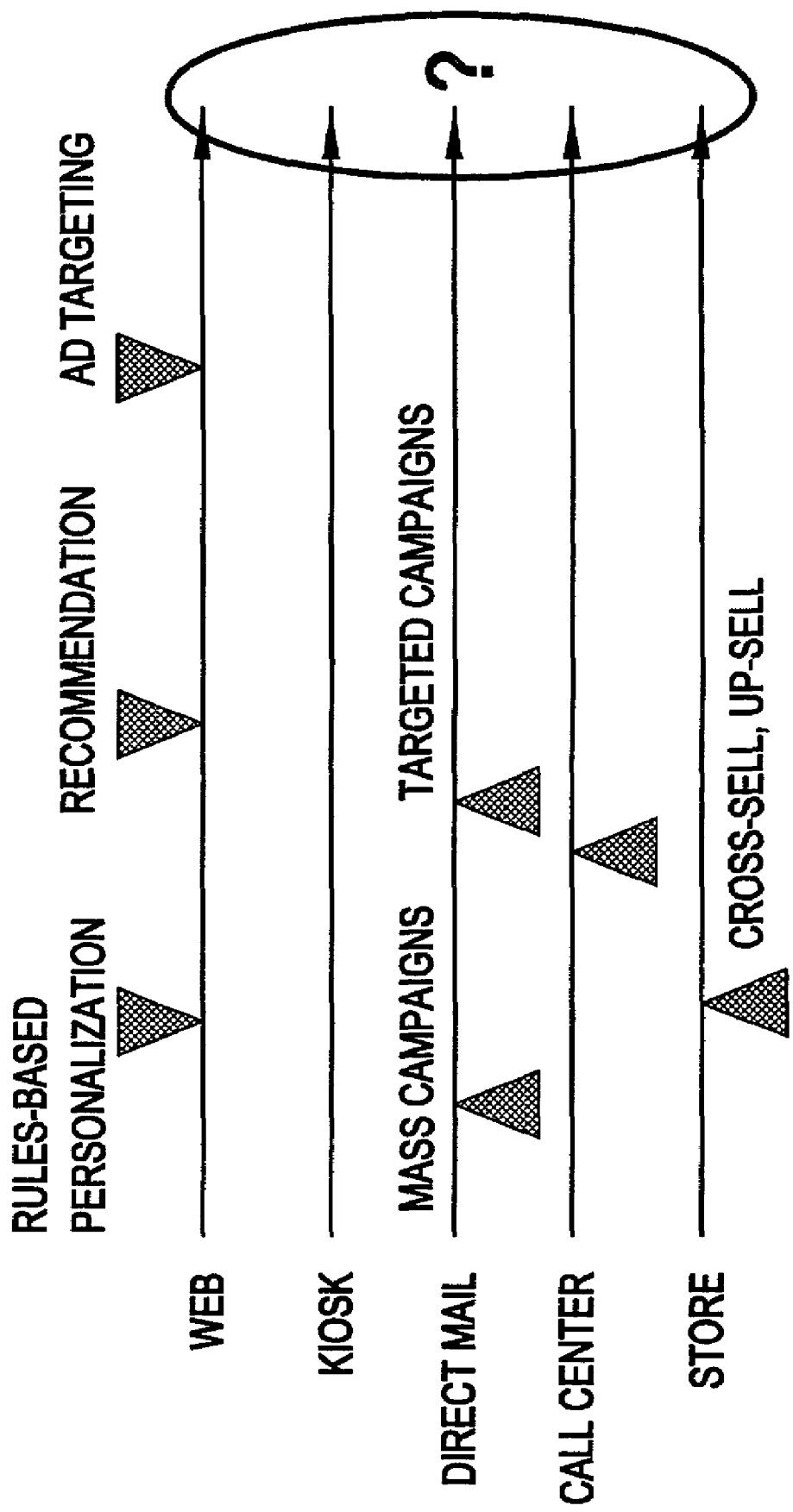
FIG. 16 illustrates a plurality of (e.g., multiple) channels in multi-channel targeted marketing.

Specifically, targeted marketing may be considered delivering a marketing message to maximize a response. As shown in FIG. 16, targeted marketing may involve personalized information and campaigns. For instance, it may involve cross-selling and up-selling of products and offers (rebate, discount, coupons, etc.).

Some underlying technologies may include customer segmentation, response modeling, and customer value prediction. They may also include collaborative filtering and cost sensitive learning. Further, they may also include real time personalization (e.g., using the world-wide web (WWW)).

Figure 17:
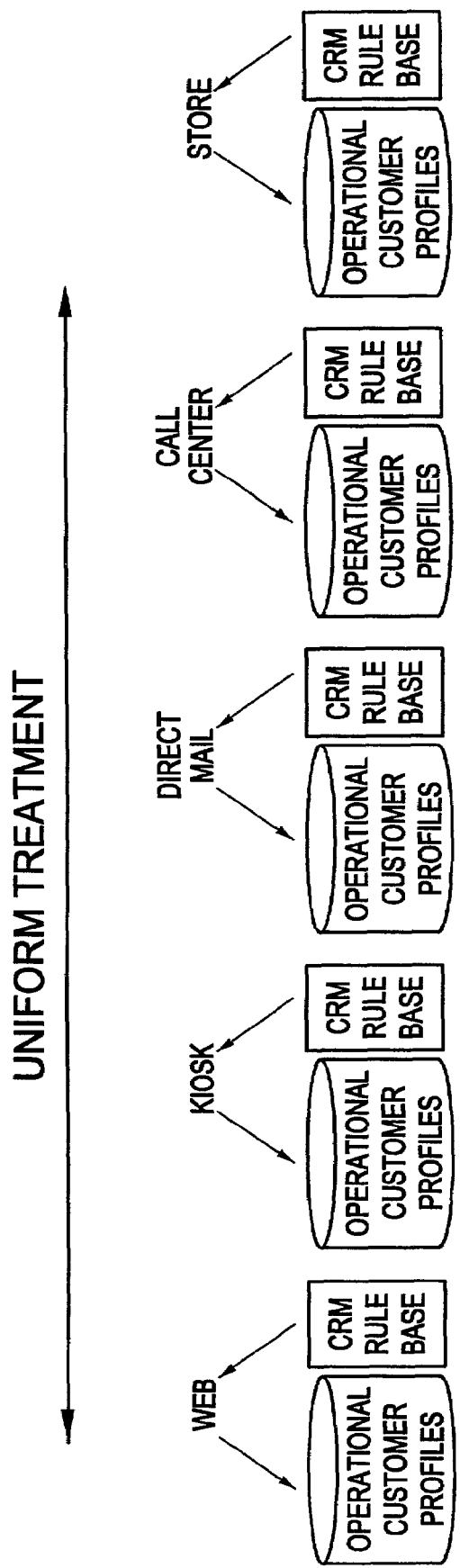
FIG. 17 illustrates a uniform treatment across a multi-channel targeted marketing.

One challenge to targeted marketing is the multi-channel retailing challenge. As shown in FIG. 17, one business imperative is customers are expecting a unified shopping experience across multiple channels. However, there are potential obstacles to retailers in meeting this imperative. For example, retailers do not necessarily have a singular clear view of their customers. Further, retailers may not have systems in place to deliver correct merchandise to correct customer at correct time for correct price in multi-channel environment. In addition, retailers may be relying on legacy systems to gain a competitive advantage in the multi-channel area Recent trends and solutions to overcoming these difficulties involve infrastructure to support multi-channel integration and advanced analytics to fully leverage multi-channel customer data.

Figure 18:
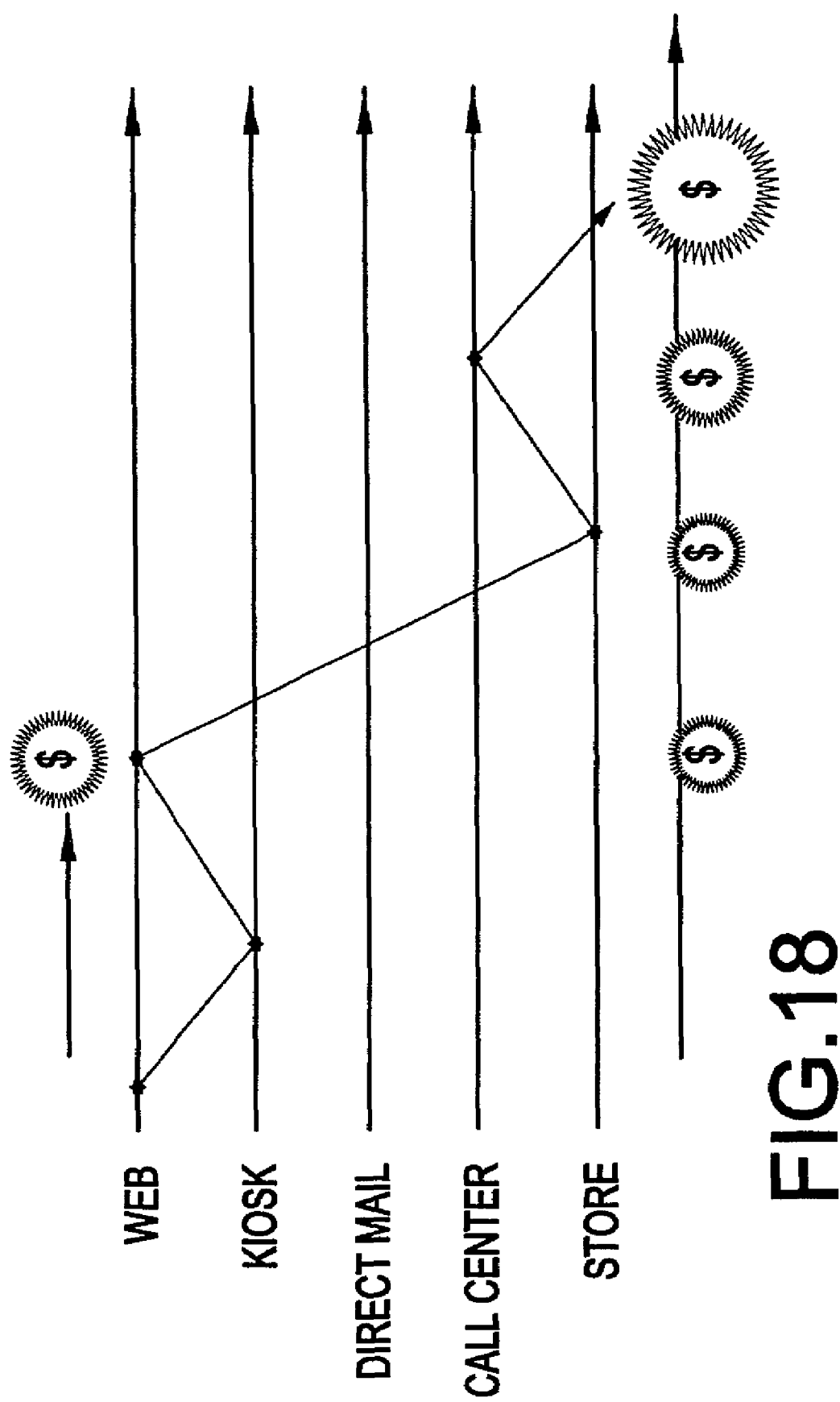
FIG. 18 illustrates how targeted marketing may be optimized across a plurality of channels.

It is generally recognized in the area of analytics for Customer Relationship Management that maximizing customer lifetime value by keeping them loyal requires retailers to track customer behaviors across all touchpoints and leverage this knowledge for targeted marketing. Today's analytics involve making marketing decisions to maximize immediate revenue. However, this has limitations including being single-event oriented, if not single-channel driven. As shown in FIG. 18, on the other hand, the analytics offered by the present invention can involve optimizing targeted marketing across all channels for lifetime value maximization.

Today's targeted marketing is rife with drawbacks. For example, in single-channel targeted marketing, a customer may receive promotional mail she is not interested in, and may get the same promotion from a call center. In addition, a customer may show an interest in a promotion campaign on the phone and have to explain her interest again at the store and again on the web.

In single-event targeted marketing, a customer may receive many copies of the same promotion catalog over a relatively short period of time. Further, a first-time customer may not receive any promotion campaigns she is interested in just because she has so far generated no revenue.

Further, in multi-channel single-event targeted marketing, a customer may always make purchases in store and come to the web only for information, and is annoyed by being pushed to do on-line shopping. In addition, after a customer makes a purchase online, she may receive a huge number of direct mail campaigns related to that purchase.

In multi-channel targeted marketing, on the other hand, if a customer receives promotional mail she is not interested in, she should not get the same promotion from a call center. Also, if a customer shows an interest in a promotion campaign on the phone then she should not have to explain her interest again at the store.

In an ideal multi-event targeted marketing, a customer should not receive multiple copies of the same promotion catalog over a relatively short period of time. Further, a first-time customer will receive promotion campaigns she is interested in, to build up customer loyalty and generate future revenue.

In an ideal multi-channel multi-event targeted marketing, a customer who always makes purchases in store and comes to the web only for information will be awarded with online rebate/coupons for the store. For instance, after a customer makes a purchase online, she will receive just the right amount of direct mail campaigns related to that purchase.

Figure 19:
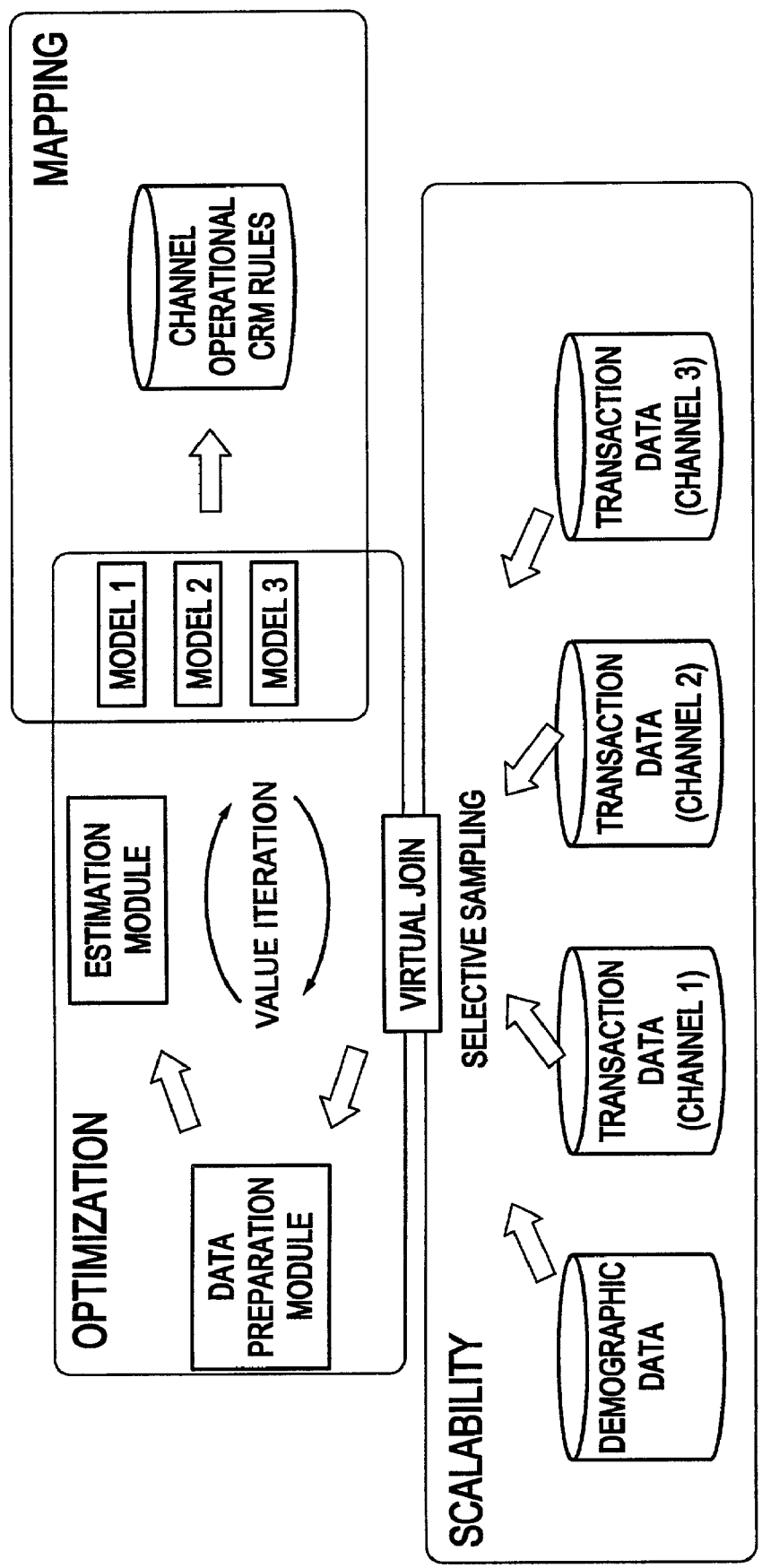
FIG. 19 illustrates core issues in cross-channel optimized marketing (CCOM) according to the present invention.

Therefore, the inventors have developed cross-channel optimized marketing (CCOM) technology. Specifically, as shown in FIG. 19, the inventors are developing CCOM for customer lifetime value maximizing by addressing at least three core technical issues, (1) scalability for integrating large multi-channel data, (2) optimizing rules across multiple channels and over customer's life time, and (3) mapping rules into channel-specific actions.

A key feature of the present invention (e.g., including CCOM) is that it achieves desired cross-channel customer behavior via optimized channel-specific targeted marketing rules. For instance, the present invention may leverage cross-channel historical data on customer buying behavior, channel behavior, and promotion-response behavior. Further, it may automatically generate channel specific targeting rules, optimized across all channels. In addition, it may automatically generate instance-in-time targeting rules, optimized for sequence of targeting actions.

Further, the present invention maximizes customer loyalty. For example, it directly achieves customer lifetime value maximization. Further, it implicitly maximizes the intrinsically unobservable customer loyalty.

There are other added advantages of the present invention as well. For example, it is extendible. That is, channel-specific rules can be edited to meet constraints. The invention is also robust. That is, channel-specific rules are robust to various changes. In addition, the invention is compatible. That is, channel-specific rules can be incorporated into existing channel-specific CRM installations.

Figure 20:
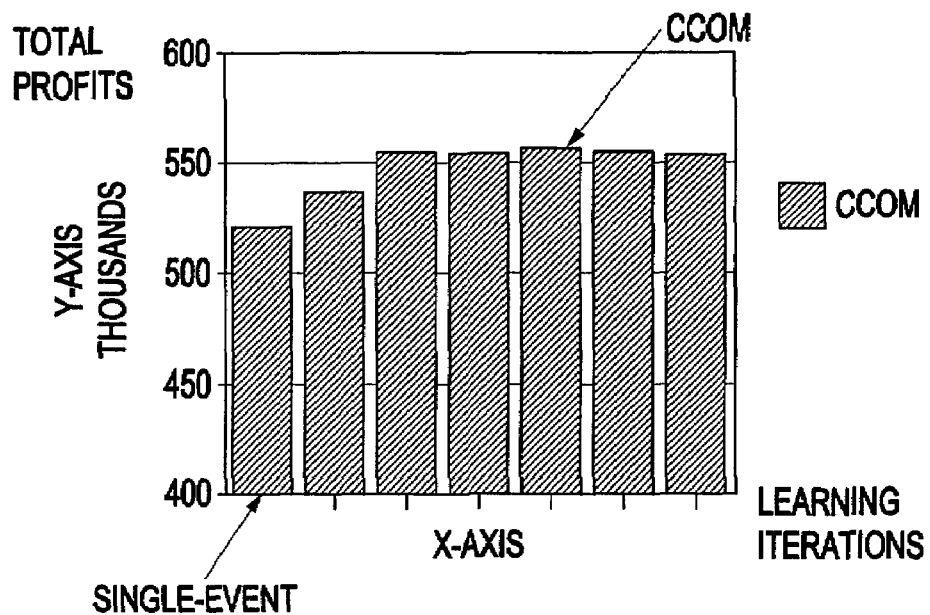
FIGS. 20-23 provide graphs for evaluating a CCOM pilot according to the present invention.
Figure 21:
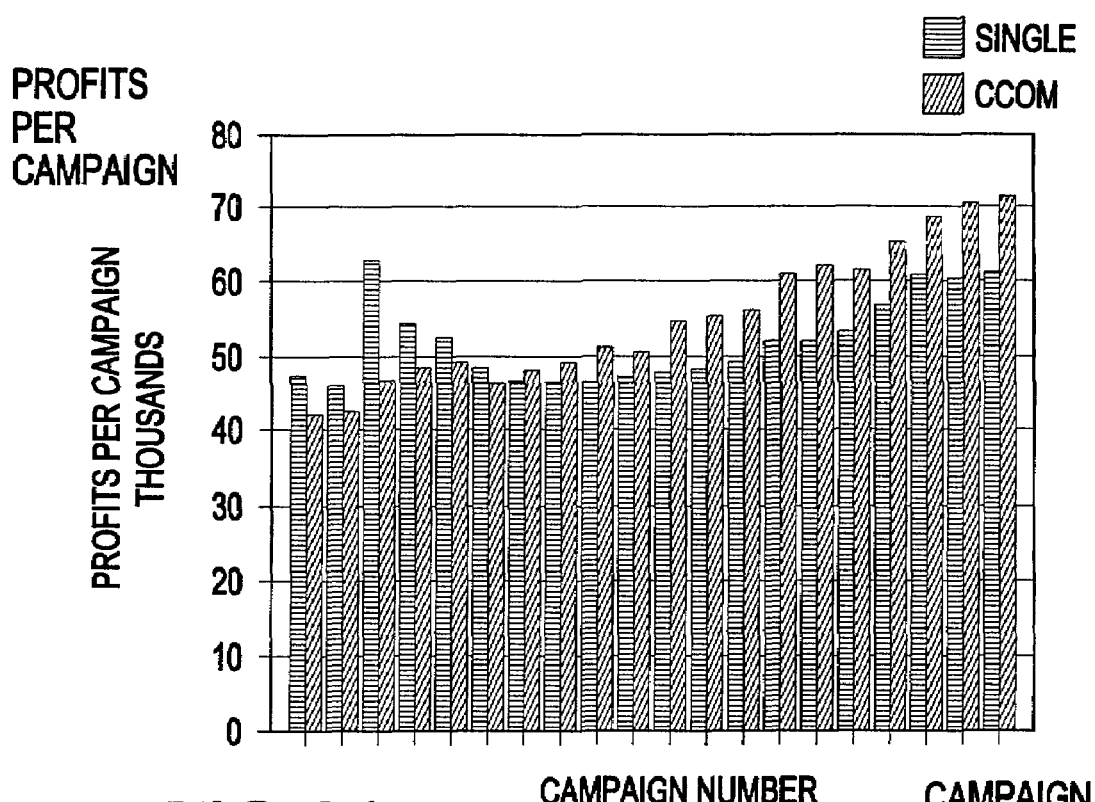
Figure 22:
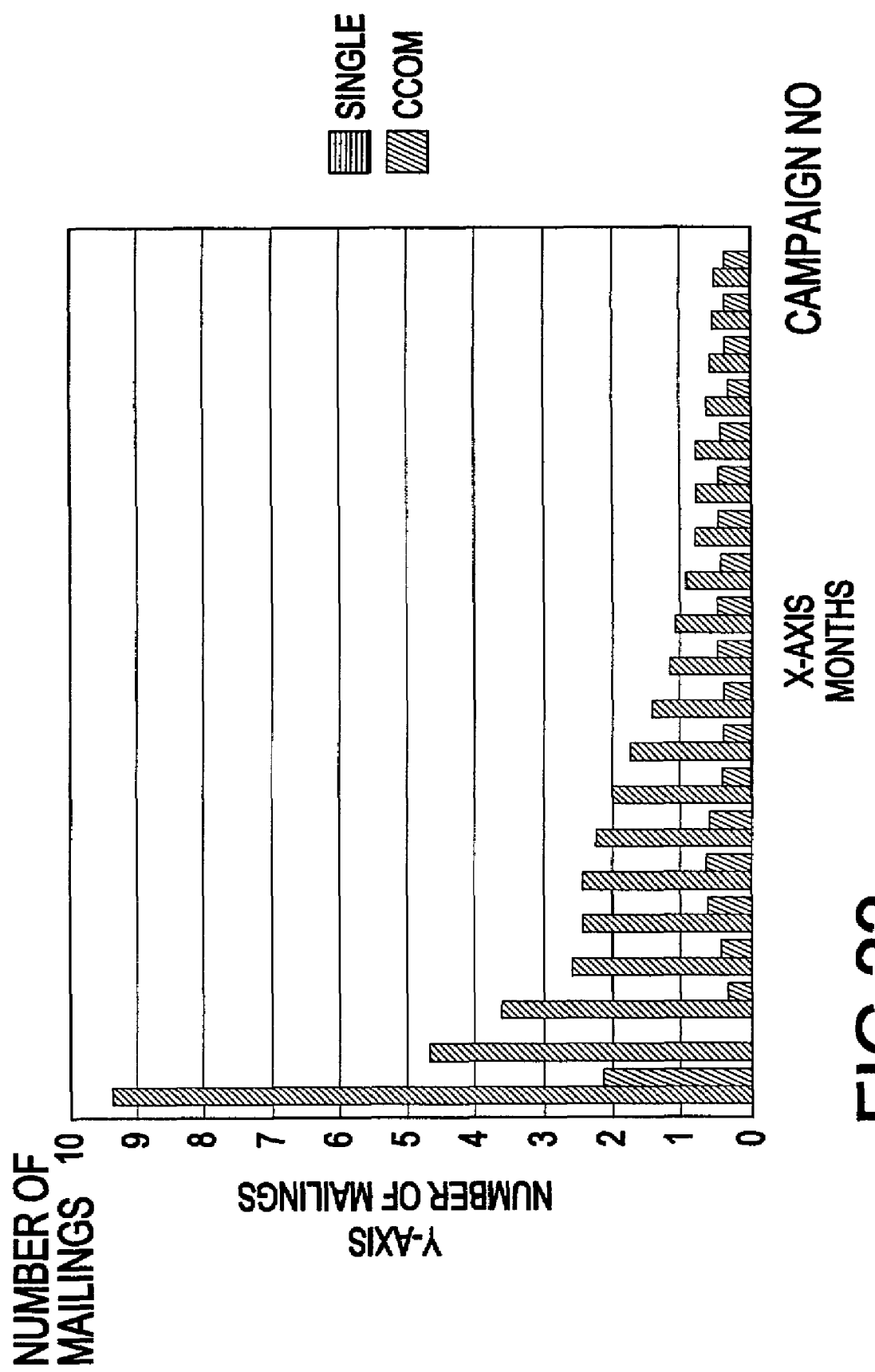
Figure 23:
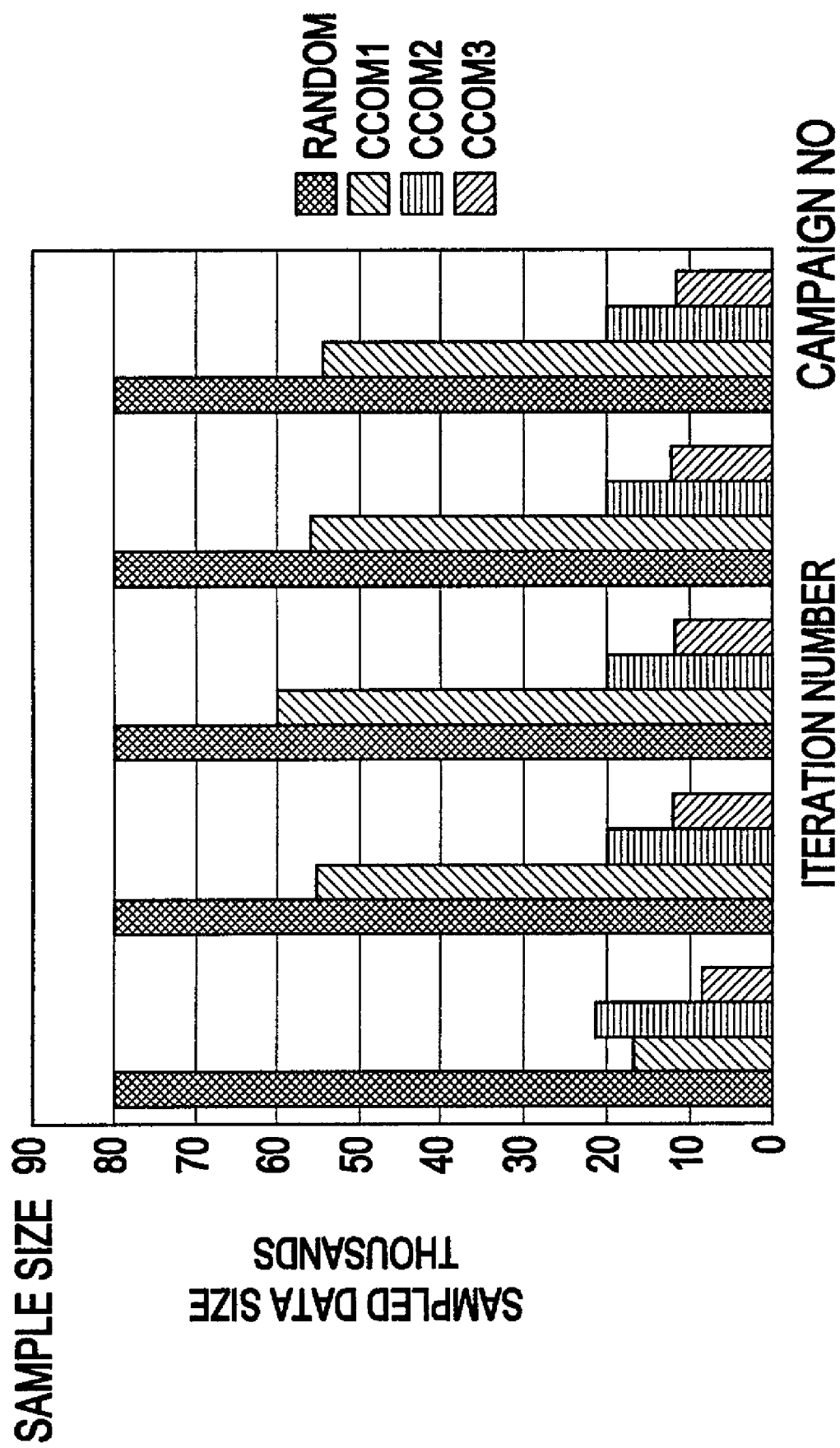

Some of the advantages of the present invention are clearly shown by a pilot evaluation, the results of which are analyzed in FIGS. 20-23. For instance, FIG. 20 illustrates how the present invention achieves more profits, FIG. 21 illustrates how the present invention maximizes life-time value, FIG. 22 illustrates how the rules of the present invention are practical, and FIG. 23 illustrates how the present invention is scalable.

Figure 24:
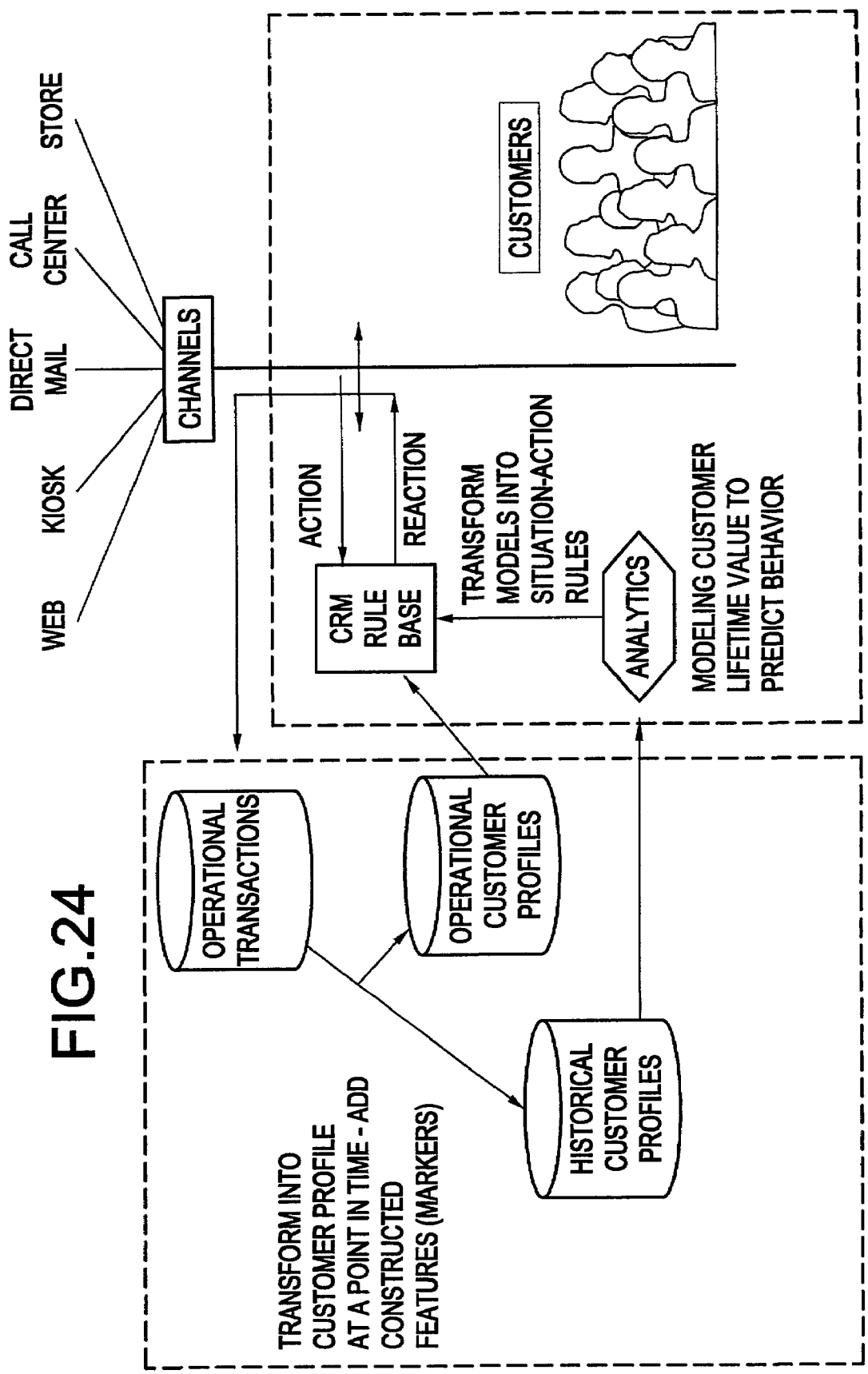
FIG. 24 illustrates a possible infrastructure for CCOM according the present invention.

FIG. 24 illustrates one possible infrastructure for the present invention including CCOM. For example, in this example, the channels include the web, kiosk, direct mail, a call center, and a store. The rules from the customer relationship management (CRM) rule base are applied to operational transactions to transform into customer profiles (e.g., operational and historical) at a point in time. The customer lifetime value is modeled to predict customer behavior. These models are transformed into situation-action rules which may be used to update the CRM rule base.

One important aspect of the present invention is with respect to marketing actions on the worldwide web. For instance, targeted marketing actions on the worldwide web may involve personalized cross-channel web campaigns, which may include rebate (store use), discount (catalogue), and/or coupon (issued at kiosk). Further, personalized product recommendation may be used to cross-sell and/or up-sell.

Thus, several scenarios of CCOM-driven web targeted marketing can be envisioned. For example, the present invention may provide information service on the web and give out coupons on products of interest for store use. Further, the seller (e.g., retailer) may first offer some discounts for online shopping to build up loyalty and then recommend revenue generators in store. Further, the seller may offer cross-sell information on the web following purchase via catalogue of related products. In addition, the seller may offer up-sell coupons on the web following purchase in store of related products.

Figure 25:
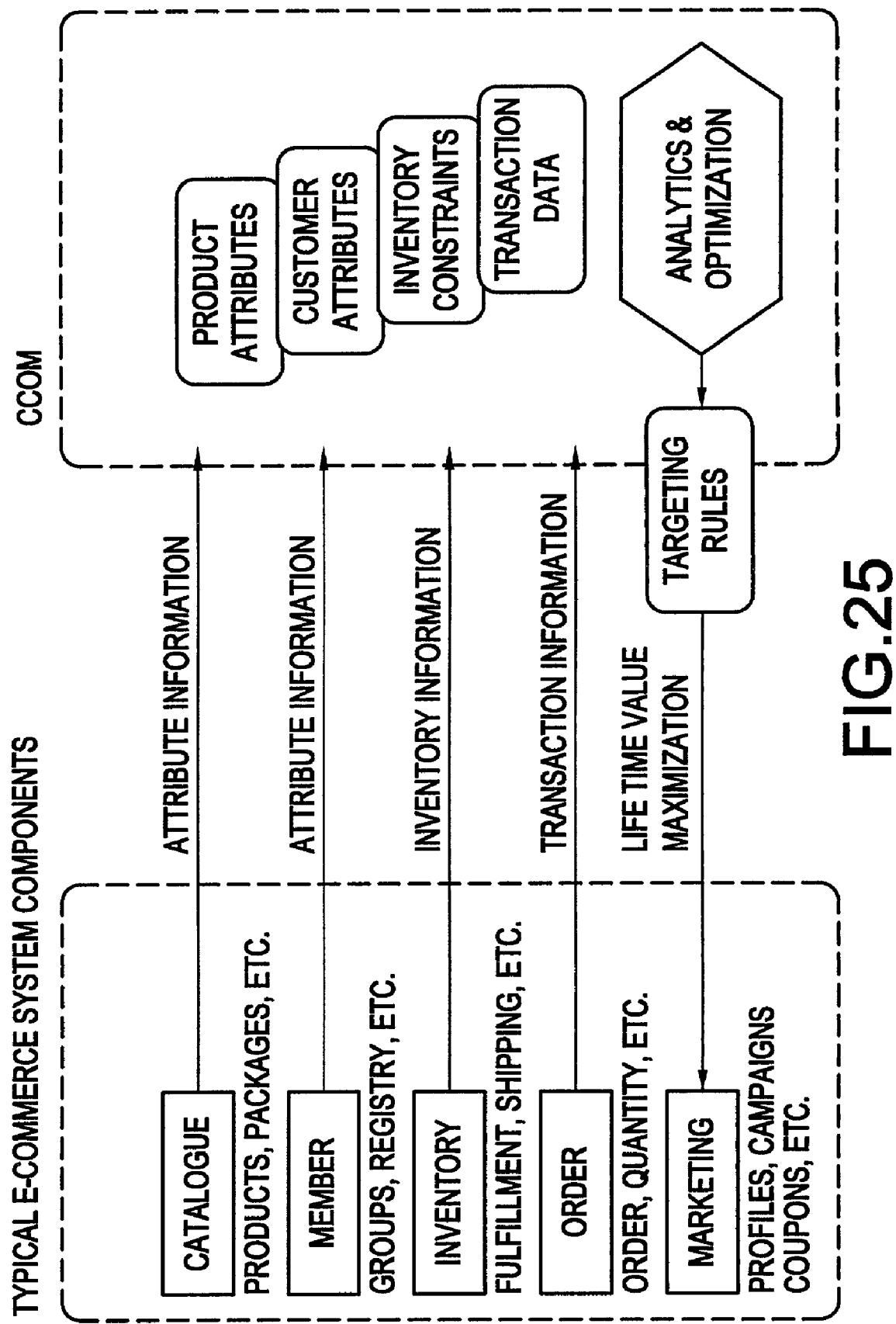
FIG. 25 illustrates an exemplary mapping of CCOM generated marketing actions into web campaign systems according to the present invention.

For example, FIG. 25 shows an exemplary mapping of CCOM generated marketing actions into web campaign systems. As shown in FIG. 25, the channel specific targeting rules generated by CCOM are compatible with existing e-commerce systems.

Another interesting aspect of the present invention is with respect to marketing actions in direct mailing. For example, targeted marketing in direct mailing may involve, for example, personalized catalog mailing which gives rise to issues such as catalog content, choice of catalog types, seasonal mailings, frequency of mailings and price range.

Thus, several scenarios of CCOM-driven targeted direct mailing can be envisioned. For instance, the seller may first provide information by mailing variety of catalogs and focus on specific areas after purchase. The seller may also avoid saturation by avoiding mailing of large number similar catalogues in short period of time. Further, the seller may mail seasonal campaign mailing following access of seasonal information on the web. In addition, the seller may mail catalogs for up-sell and cross-sell information following purchases in store.

Figure 26:
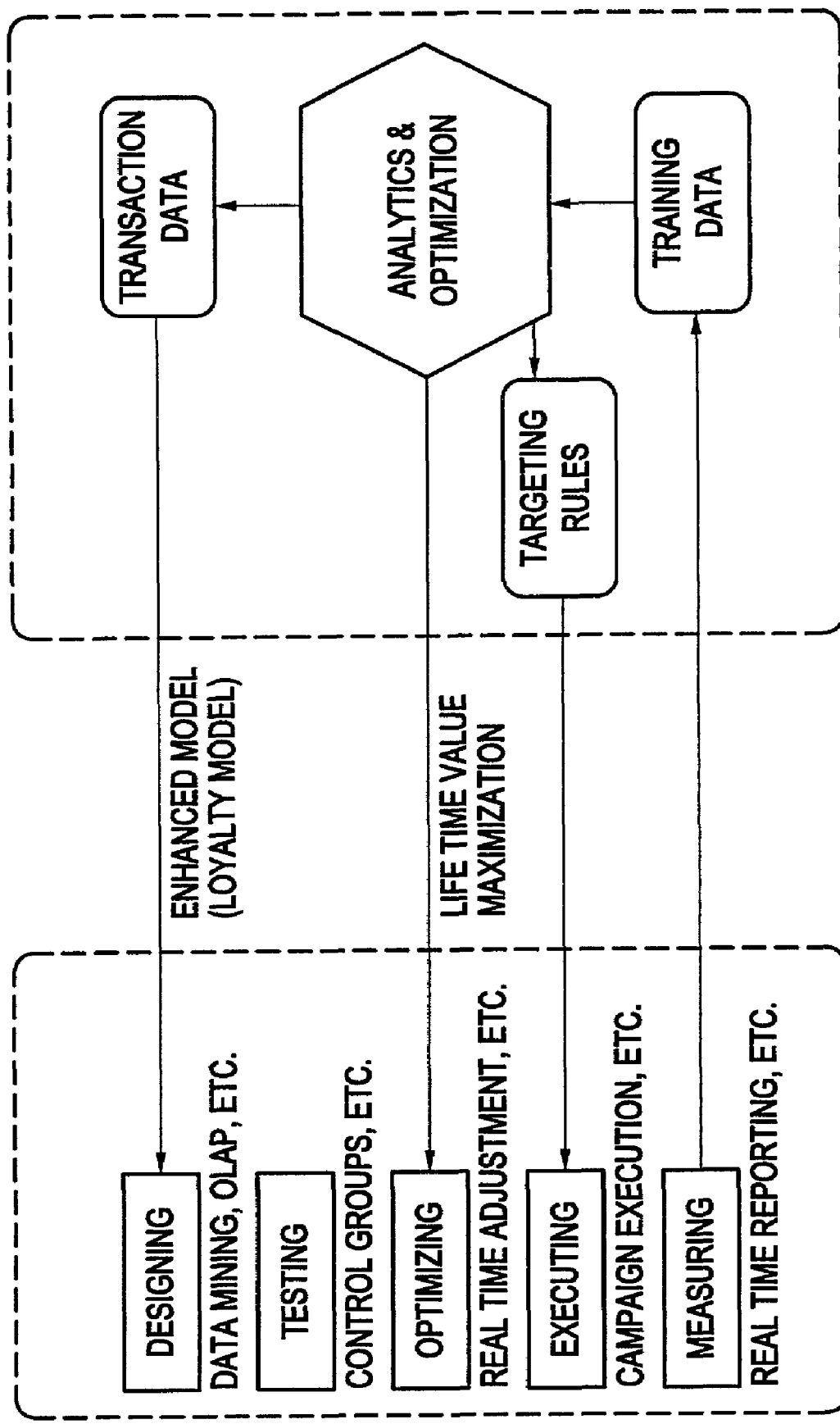
FIG. 26 illustrates an exemplary mapping of CCOM generated marketing actions into mail campaign systems according to the present invention.

FIG. 26 shows an exemplary mapping of CCOM generated marketing actions into mail campaign systems. As shown in FIG. 26, CCOM provides powerful enhancements to key components in existing campaign management systems.

Thus, several types of data may be used by CCOM. Such data may include data for customer identification across channels. For instance, such data may include a large enough set of identifiable customers, history data of promotions in at least 1 channel, and behavioral (response, purchase, etc.) data from multiple channels. Such data may also include channel behavioral data (e.g., direct mail). For instance, such data may include a history of promotions, dated, and behaviors. Such data may also include demographic data such as income, address, gender, etc.

Referring again to the drawings, FIG. 27 illustrates a typical hardware configuration which may be used for implementing the inventive system and method for buying and selling merchandise. The configuration has preferably at least one processor or central processing unit (CPU) 2711. The CPUs 2711 are interconnected via a system bus 2712 to a random access memory (RAM) 2714, read-only memory (ROM) 2716, input/output (I/O) adapter 2718 (for connecting peripheral devices such as disk units 2721 and tape drives 2740 to the bus 2712), user interface adapter 2722 (for connecting a keyboard 2724, mouse 2726, speaker 2728, microphone 2732, and/or other user interface device to the bus 2712), a communication adapter 2734 for connecting an information handling system to a data processing network, the Internet, and Intranet, a personal area network (PAN), etc., and a display adapter 2736 for connecting the bus 2712 to a display device 2738 and/or printer 2739. Further, an automated reader/scanner 2740 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 2711 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 2711 and hardware above, to perform the method of the invention.

This signal-bearing media may include, for example, a RAM contained within the CPU 2711, as represented by the fast-access storage for example. Alternatively, the instructions may be contained in another signal-bearing media, such as a magnetic data storage diskette 2800 (FIG. 28), directly or indirectly accessible by the CPU 2711.

Whether contained in the computer server/CPU 2711, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

With its unique and novel features, the inventive system and method provides an improved manner of decision making. Specifically, the present invention uses sequential decision making which is more accurate and efficient than conventional systems. Thus, for example, when applied to customer-retailer relationship management, unlike conventional systems, the present invention may maximize a net present value of profits and losses with respect to the customer.

While the invention has been described in terms of preferred embodiments, those skilled in the art will recognize that the invention can be practiced with modification within the spirit and scope of the appended claims. For example, although the present invention is described herein at times in terms of marketing decision making, this should not be considered limiting so that the present invention would apply to other forms of sequential decision making which do not necessarily involve marketing.

What is claimed is:

1. A method for sequential decision making for customer relationship management, comprising:
   providing customer data comprising stimulus-response history data for a population of customers, said stimulus-response history data being derived from event data for said customers;
   automatically generating actionable rules for optimizing a sequence of decisions over a period of time based on said stimulus-response history data;
   estimating a value function using batch reinforcement learning with function approximation, said function approximation representing the value function as a function of state features and actions, and said estimating a value function using batch reinforcement learning with function approximation comprising:
      estimating a function approximation of the value function of a Markov Decision Process underlying said stimulus-response history data for said population of customers; and
      iteratively applying a regression model to training data comprising sequences of states, actions and rewards resulting for said population of customers, and updating in each iteration a target reward value for each state-action pair; and
   transforming an output of a value function estimation into said actionable rules, the rules specifying what actions to take given a set of feature values corresponding to a customer, and the action taken corresponding to an action having an approximate maximum value according to said value function for the given set of feature values.

2. The method according to claim 1, wherein said reinforcement learning comprises maximizing a net present value of profits with respect to a customer.

3. The method according to claim 1, wherein said reinforcement learning maximizes a cumulative reward, R, given by $$R = \sum_{t=0}^{\infty} \gamma^t r_t$$

where $r_t$ is the reward obtained at the t'th time step and $\gamma$ is some positive constant less than 1.

4. The method according to claim 3, wherein y comprises a discount factor for calculating a net present value of future rewards based on a given interest rate.

5. The method according to claim 1, wherein said batch reinforcement learning comprises batch reinforcement learning with function approximation based on one of Q-learning and sarsa-learning.

6. The method according to claim 1, wherein said customer data comprises one of consumer data, client data and donor data.

7. The method according to claim 1,
wherein said transforming comprises generating training data using a model of said value function, said training data comprising a set of feature values and an action that corresponds to a maximum value for said set of feature values, and outputting a set of rules that are based on said training data; and
wherein said set of rules are generated using one of a classifier and a supervised learning tool.

8. The method according to claim 1, wherein said providing customer data comprises selecting customer data.

9. The method according to claim 8, wherein a value estimation repeatedly calls a data selection module one or more times per each iteration of a value iteration.

10. The method according to claim 9, wherein said value estimation repeatedly calls said data selection module by using a selection criterion to select a restricted subset for use in a value function estimation.

11. The method according to claim 10, wherein said using a selection criterion comprises selecting only those events such that their "next" states satisfy a condition that an action taken corresponds to an action with a maximum estimated cumulative value, with respect to an estimated value function from a previous value iteration.

12. The method according to claim 10, wherein said using a selection criteria comprises selecting only those events such that their next n states satisfy a condition that an action taken in each state corresponds to an action with a maximum estimated cumulative value.

13. The method according to claim 10, wherein said using a selection criterion comprises selecting only those events such that their current states satisfy a condition that an action taken correspond to an action with a maximum estimated cumulative value, with respect to an estimated value function from a previous value iteration.

14. The method according to claim 10, wherein said using a selection criterion comprises selecting only those events such that their current and the next n states satisfy a condition that an action taken correspond to an action with a maximum estimated cumulative value, with respect to an estimated value function from a previous value iteration.

15. The method according to claim 10, wherein said using a selection criterion comprises selecting only those events such that their current states satisfy a condition that an action taken corresponds to an action with a maximum upper bound of estimated cumulative value with respect to an estimated value function from a previous value iteration.

16. The method according to claim 14, wherein an n-step look ahead is used in a value function update procedure within a value estimation module, in combination with a selective sampling with n-step look ahead.

17. The method according to claim 1, wherein said customer data comprises transaction history data from multiple channels.

18. The method according to claim 17, wherein providing customer data comprises selecting customer data by accessing a number of channel specific databases, and forming an effective join of data using a form of customer identification as a key.

19. The method according to claim 1, wherein said providing said customer data comprises generating a sequence of event data.

20. The method according to claim 19, wherein said event data comprises a customer's demographic features, and features, derived from said customer's stimulus-response history data, which collectively reflect the state of said customer at a certain point in time, action taken at or around that time by an entity, a response taken by said customer at or around a time of an event, and an amount of profit realized by said entity and associated with said action.

21. The method according to claim 20, wherein said customer comprises a consumer, said entity comprises a seller, and said action comprises a marketing action.

22. A method of sequential targeted marketing for customer relationship management, comprising:
preparing customer data comprising stimulus-response history data for a population of customers, said stimulus-response history data being derived from event data for said customers; and
automatically generating actionable rules using said stimulus-response history data to output instance-in-time targeting rules for optimizing a sequence of decisions over a period of time, so as to approximately maximize expected cumulative profits over time;
estimating a value function using batch reinforcement learning with function approximation, said function approximation representing the value function as a function of state features and actions, and said estimating said value function using batch reinforcement learning with function approximation comprising:
estimating a function approximation of the value function of a Markov Decision Process underlying said stimulus-response history data for said population of customers; and
iteratively applying a regression model to training data comprising sequences of states, actions and rewards resulting for said population of customers, and updating in each iteration a target reward value for each state-action pair; and
transforming an output of a value function estimation into said actionable rules, the rules specifying what actions to take given a set of feature values corresponding to a customer, and the action taken corresponding to an action having an approximate maximum value according to said value function for the given set of feature values.

23. A method for sequential decision making for customer relationship management, comprising:
providing a database of customer data comprising stimulus-response history data for a population of customers, said stimulus-response history data being derived from event data for said customers, from a plurality of channels;
integrating said customer data; and
automatically generating actionable channel-specific targeting rules for optimizing a sequence of decisions over a period of time based on said stimulus-response history data by
estimating a value function using batch reinforcement learning with function approximation, said function approximation representing the value function as a function of state features and actions, and said estimating said value function using batch reinforcement learning with function approximation comprising comprises:

estimating a function approximation of the value function of a Markov Decision Process underlying said stimulus-response history data for said population of customers; and iteratively applying a regression model to training data comprising sequences of states, actions and rewards resulting for said population of customers, and updating in each iteration a target reward value for each state-action pair; and transforming an output of a value function estimation into said actionable rules, the rules specifying what actions to take given a set of feature values corresponding to a customer, and the action taken corresponding to an action having an approximate maximum value according to said value function for the given set of feature values.

24. The method according to claim 23, wherein cross-channel cumulative profits are optimized.

25. A system for sequential decision making for customer relationship management, comprising:

a database for storing customer data comprising stimulus-response history data for a population of customers, said stimulus-response history data being derived from event data for said customers; and a processor for automatically generating actionable rules for optimizing a sequence of decisions over a period of time based on said stimulus-response history data by estimating a value function using batch reinforcement learning with function approximation, said function approximation representing the value function as a function of state features and actions, and said estimating said value function using batch reinforcement learning with function approximation comprising:

estimating a function approximation of the value function of a Markov Decision Process underlying said stimulus-response history data for said population of customers; and iteratively applying a regression model to training data comprising sequences of states, actions and rewards resulting for said population of customers, and updating in each iteration a target reward value for each state-action pair; and transforming an output of a value function estimation into said actionable rules, the rules specifying what actions to take given a set of feature values corresponding to a customer, and the action taken corresponding to an action having an approximate maximum value according to said value function for the given set of feature values.

26. The system according to claim 25, further comprising:
a customer profile cache,
wherein when a targeting rule is applied, said customer profile cache is used to determine if an antecedent of a targeting rule is satisfied.

27. A system for sequential decision making for customer relationship management, comprising:

a data preparation device for preparing customer data comprising stimulus-response history data;

a value estimator for estimating a value function based on said stimulus-response history data for a population of customers, said stimulus-response history data being derived from event data for said customers; and a rule transformer for generating actionable rules for optimizing a sequence of decisions over a period of time based on said value function by estimating a value function using batch reinforcement learning with function approximation, said function approximation representing the value function as a function of state features and actions, and said estimating said value function using batch reinforcement learning with function approximation comprising:

estimating a function approximation of the value function of a Markov Decision Process underlying said stimulus-response history data for said population of customers; and iteratively applying a regression model to training data comprising sequences of states, actions and rewards resulting for said population of customers, and updating in each iteration a target reward value for each state-action pair; and transforming an output of a value function estimation into said actionable rules, the rules specifying what actions to take given a set of feature values corresponding to a customer, and the action taken corresponding to an action having an approximate maximum value according to said value function for the given set of feature values.

28. A system for sequential cost-sensitive decision making for customer relationship management, comprising:

a customer transaction cache for storing customer transaction data comprising stimulus-response history data for a population of customers, said stimulus-response history data being derived from event data for said customers;

a customer profile cache for receiving an output of said customer transaction cache and storing current customer profile data; and a customer relationship management system, for receiving an output of said customer profile cache and customer relationship management rules for optimizing a sequence of decisions over a period of time, wherein said customer relationship management rules are automatically generated based on said stimulus-response history data by estimating a value function using batch reinforcement learning with function approximation, said function approximation representing the value function as a function of state features and actions, and said estimating said value function using batch reinforcement learning with function approximation comprising:

estimating a function approximation of the value function of a Markov Decision Process underlying said stimulus-response history data for said population of customers; and iteratively applying a regression model to training data comprising sequences of states, actions and rewards resulting for said population of customers, and updating in each iteration a target reward value for each state-action pair; and transforming an output of a value function estimation into said actionable rules, the rules specifying what actions to take given a set of feature values corresponding to a customer, and the action taken corresponding to an action having an approximate maximum value according to said value function for the given set of feature values.

29. A programmable storage medium tangibly embodying a program of machine-readable instructions executable by a digital processing apparatus to perform a method for sequential decision-making method for customer relationship management, said method comprising:

providing customer data comprising stimulus-response history data for a population of customers, said stimulus-response history data being derived from event data for said customers; and automatically generating actionable rules for optimizing a sequence of decisions over a period of time based on said stimulus-response history data by estimating a value function using batch reinforcement learning with function approximation, said function approximation representing the value function as a function of state features and actions, and said estimating a value function using batch reinforcement learning with function approximation comprising:

estimating a function approximation of the value function of a Markov Decision Process underlying said stimulus-response history data for said population of customers; and iteratively applying a regression model to training data comprising sequences of states, actions and rewards resulting for said population of customers, and updating in each iteration a target reward value for each state-action pair; and transforming an output of a value function estimation into said actionable rules, the rules specifying what actions to take given a set of feature values corresponding to a customer, and the action taken corresponding to an action having an approximate maximum value according to said value function for the given set of feature values.

30. The method according to claim 1, wherein said stimulus-response history data for each customer comprises a sequence of said customer's demographic features and event features, at multiple time points, which collectively reflect the state of said customer at a point in time, an action taken at or around that time by an entity, a response taken by said customer at or around that time, and an amount of profit realized by said entity and associated with said action.

31. The method according to claim 30, wherein said updating said target reward value for each state-action pair uses one of a look-ahead update formula of reinforcement learning, in terms of the reward value corresponding to said state-action pair in the training data, and an estimated value of the value function estimate from a previous iteration, for state-action pairs at a future time following said state-action pair.

* * * * *